US012750595B2

(12) United States Patent
Kim et al.

(10) Patent No.: US 12,750,595 B2
(45) Date of Patent: Sep. 29, 2026

(54) IMAGE SIGNAL PROCESSOR AND METHOD OF PROCESSING IMAGE SIGNAL

(71) Applicant: SK hynix Inc., Icheon-si (KR)

(72) Inventors: Dong Ik Kim, Icheon-si (KR); Cheol Jon Jang, Icheon-si (KR); Jun Hyeok Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 100 days.

(21) Appl. No.: 18/883,583

(22) Filed: Sep. 12, 2024

(65) Prior Publication Data

US 2025/0126368 A1 Apr. 17, 2025

(30) Foreign Application Priority Data

Oct. 11, 2023 (KR) ........................ 10-2023-0135268

(51) Int. Cl.
*H04N 23/84* (2023.01)
*H04N 17/00* (2006.01)

(52) U.S. Cl.
CPC ......... *H04N 23/843* (2023.01); *H04N 17/002* (2013.01)

(58) Field of Classification Search
CPC ............................. H04N 25/68; H04N 25/683
See application file for complete search history.

(56) References Cited

U.S. PATENT DOCUMENTS 8,422,816 B2 * 4/2013 Chen ...................... H04N 25/70 358/463
9,773,319 B2 * 9/2017 Oka .......................... G06T 7/13
2012/0039545 A1 * 2/2012 Chen ...................... H04N 25/70 382/275
2015/0339827 A1 * 11/2015 Oka .......................... G06T 7/13 382/199
2020/0336684 A1 * 10/2020 Wang .................. H04N 23/843
2021/0358994 A1 11/2021 Lee et al.
2022/0070383 A1 3/2022 Kobayashi et al.

FOREIGN PATENT DOCUMENTS

JP 2014121075 A * 6/2014 ............ H10F 39/12
JP 2015161727 A 9/2015

* cited by examiner

*Primary Examiner* — Sinh Tran
*Assistant Examiner* — Mehedi Nmn Hassan
(74) *Attorney, Agent, or Firm* — WILLIAM PARK AND ASSOCIATES LTD.

(57) ABSTRACT

An image signal processor may include a defect pixel determination unit configured to determine whether a target pixel is a defect pixel based on first comparison data that are a result of comparing pixel data of the target pixel included in a target kernel with pixel data of each of a plurality of pixels having attributes identical with attributes of the target pixel, a direction determination unit configured to determine a direction of the target kernel based on second comparison data that are a result of a comparison between pixel data of a pair of pixels that are disposed on a line in one direction and that have identical attributes, and a pixel interpolation unit configured to interpolate the pixel data of the target pixel by using the pixel data of each of a plurality of pixels that are disposed at locations corresponding to the direction of the target kernel.

18 Claims, 23 Drawing Sheets

IMAGE SIGNAL PROCESSOR AND METHOD OF PROCESSING IMAGE SIGNAL

CROSS-REFERENCES TO RELATED APPLICATION

The present application claims priority under 35 U.S.C. § 119(a) to Korean patent application number 10-2023-0135268, filed on Oct. 11, 2023, in the Korean Intellectual Property Office, which application is incorporated herein by reference in its entirety.

BACKGROUND

1. Technical Field

Various embodiments relate to an image signal processor capable of performing an image conversion and a method of processing an image signal.

2. Related Art

An image sensing device is a device that captures an optical image by using the property of a light detection semiconductor material that reacts to light. With the development of various industries, such as vehicles, medical treatment, computers, and communications, the demand for high-performance image sensing devices has increased in various fields, such as smartphones, digital cameras, gaming devices, Internet of Things, robots, cameras for security, and micro cameras for medical treatment.

A pixel array in which an image sensing device directly captures an optical image may include a defect pixel that cannot obtain a color image normally due to an issue with the process. Furthermore, in order to implement an auto-focusing function, the pixel array may include a phase difference detection pixel. The phase difference detection pixel that obtains phase difference-related information may be treated as a defect pixel from a viewpoint of a color image because the phase difference detection pixel cannot obtain a color image like the defect pixel.

SUMMARY

In an embodiment, an image signal processor may include a defect pixel determination unit configured to determine whether a target pixel is a defect pixel based on first comparison data that are a result of comparing pixel data of the target pixel included in a target kernel with pixel data of each of a plurality of pixels having attributes identical with attributes of the target pixel, a direction determination unit configured to determine a direction of the target kernel based on second comparison data that are a result of a comparison between pixel data of a pair of pixels that are disposed on a line in one direction and that have identical attributes, and a pixel interpolation unit configured to interpolate the pixel data of the target pixel by using the pixel data of each of a plurality of pixels that are disposed at locations corresponding to the direction of the target kernel.

In an embodiment, an image signal processor may include a defect pixel determination unit configured to determine whether a target pixel is a defect pixel based on first comparison data that are a result of comparing pixel data of the target pixel included in a target kernel with pixel data of each of a plurality of pixels having attributes identical with attributes of the target pixel, and a pixel interpolation unit configured to interpolate the pixel data of the target pixel by using pixel data of each of a plurality of pixels that are disposed at locations corresponding to a direction of the target kernel. The identical attributes may be attributes corresponding to an identical color and an identical channel.

In an embodiment, a method of processing an image signal may include determining whether a target pixel is a defect pixel by comparing pixel data of the target pixel included in a target kernel with pixel data of a pixel corresponding to a color and channel identical with a color and channel of the target pixel, determining a direction of the target kernel by comparing pixel data of each of a plurality of pixels that are disposed within the target kernel with pixel data of each of a plurality of pixels corresponding to a color and channel identical with a color and channel of the plurality of pixels, and interpolating the pixel data of the target pixel by using pixel data of each of a plurality of pixels that are disposed at locations corresponding to a direction of the target kernel.

DETAILED DESCRIPTION

Hereafter, various embodiments of the present disclosure will be described with reference to the accompanying drawings. However, it should be noted that the present disclosure is not limited to specific embodiments, but includes various modifications, equivalents and/or alternatives. An embodiment of the present disclosure may provide various effects which may be recognized directly and indirectly through the present disclosure.

Various embodiments are directed to providing an image signal processor capable of increasing the accuracy of corrections for a defect pixel and a method of processing an image signal.

A sensor that detects a phase difference cannot correct a defect pixel through the existing common defect pixel correction algorithm because the sensor includes an error attributable to a phase difference. The technical spirit of the present disclosure may provide a method of detecting and correcting a defect pixel in order to correct a defect pixel in a sensor that detects a phase difference.

The technical problems of the present disclosure are not limited to the above-mentioned technical problems, and other technical problems which are not mentioned herein will be clearly understood by those skilled in the art from the following descriptions.

According to embodiments disclosed in this document, the accuracy of corrections for a defect pixel can be increased although an error occurs between pixels due to a phase difference by determining the direction of a target kernel by considering the characteristics of a sensor that uses a microlens and interpolating the target pixel based on the determined direction.

In addition, it is possible to provide various effects which are directly or indirectly understood through this document.

Figure 1:
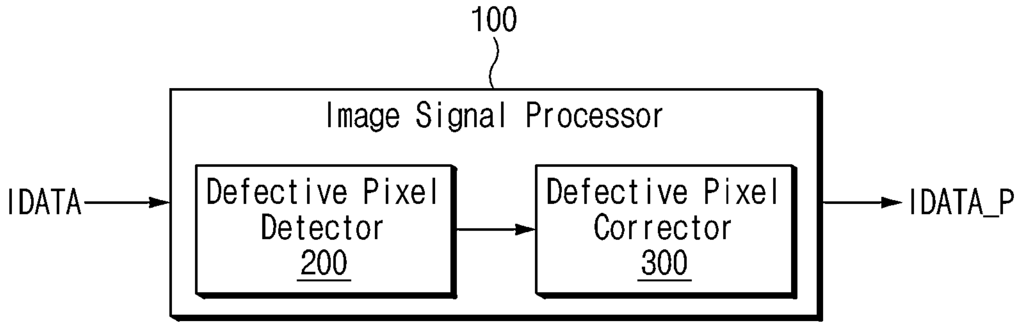
FIG. 1 is a block diagram illustrating an image signal processor according to an embodiment of the present disclosure.

FIG. 1 is a block diagram illustrating an image signal processor according to an embodiment of the present disclosure.

Referring to FIG. 1, an image signal processor (ISP) 100 may generate image data IDATA_P that have been processed by performing at least one piece of image signal processing on image data IDATA. The ISP 100 may perform image signal processing for reducing noise of the image data IDATA and improving picture quality, such as demosaicing, defect pixel corrections, gamma corrections, color filter array interpolation, a color matrix, color corrections, color enhancement, and lens distortion corrections. Furthermore, the ISP 100 may generate an image file by compressing and processing image data on which image signal processing has been performed or may restore image data from an image file. A compression format of an image may be a reversible format or an irreversible format. In the case of a still image, the joint photographic experts group (JPEG) format or the JPEG 2000 format may be used as an example of the compression format. Furthermore, in the case of a moving image, a moving image file may be generated by compressing a plurality of frames according to the moving picture experts group (MPEG) standard as an example of the compression format.

The image data IDATA may be generated by an image sensing device that captures an optical image of a scene, but the scope of the present disclosure is not limited thereto. The image sensing device may include a pixel array including a plurality of pixels for detecting reflected light that is incident from a scene, a control circuit for controlling the pixel array, and a readout circuit. The readout circuit may convert a pixel signal, which is received from the pixel array and that has an analog form, into the image data IDATA having a digital form and outputting the image data IDATA. In the present disclosure, the image data IDATA are described assuming that the image data IDATA are generated by the image sensing device.

The pixel array of the image sensing device may include defect pixels incapable of capturing a color image normally due to a limit in the process or the introduction of temporary noise. Furthermore, the pixel array may include phase difference detection pixels that obtain phase difference-related information to implement an auto-focusing function. The phase difference detection pixel may be treated as a defect pixel from a viewpoint of a color image because the phase difference detection pixel cannot obtain a color image like the defect pixel. In the present disclosure, the defect pixel and the phase difference detection pixel may be collectively called a "defect pixel".

To improve the quality of a color image, it is essential to increase the accuracy of correcting a defect pixel. To this end, the ISP 100 according to an embodiment of the present disclosure may include a defect pixel detector 200 and a defect pixel corrector 300.

The defect pixel detector 200 may detect the pixel data of a defect pixel in the image data IDATA. In the present disclosure, digital data corresponding to the pixel signal of each pixel may be defined as pixel data, for convenience of description. A set of pixel data corresponding to a predetermined unit (e.g., a frame or a kernel) may be defined as the image data IDATA. In this case, the frame may correspond to the entire pixel array, and the kernel may correspond to a unit for image signal processing.

According to an embodiment, the defect pixel detector 200 may detect the pixel data of a defect pixel based on the image data IDATA. The defect pixel detector 200 may determine whether a target pixel is a defect pixel based on a difference between the pixel data of the target pixel and pixel data within a kernel. The target pixel is a target to be determined as to whether it corresponds to a defect pixel. For example, the defect pixel detector 200 may determine whether a target pixel is a defect pixel based on a difference between the pixel data of the target pixel and an average value of the pixel data of the pixels within a kernel. That is, when the difference between the pixel data of the target pixel and the average value of the pixel data of the pixels within the kernel is greater than or equal to a preset threshold value, the defect pixel detector 200 may determine that the target pixel is a defect pixel that does not have normal pixel data.

The preset threshold value that is used in this document may be a fixed to be constant or may be a specific ratio of a brightness value (or a green average value) of a current kernel. In an example, the ISP 100 may set the preset threshold value based on a standard deviation between pixels disposed within a target kernel. For example, the ISP 100 may set the preset threshold value by comparing a standard deviation between pixels disposed in the same channel within a target kernel and the pixel data of the pixels disposed within the target kernel.

In the present disclosure, the same channel may mean the location of a pixel having the same relative location from the central point of a microlens. A more detailed definition of pixels disposed in the same channel will be described later with reference to FIG. 4A and drawings subsequent to FIG. 4A.

According to another embodiment, the defect pixel detector 200 may receive information regarding the location of a defect pixel, which has been previously stored, from the image sensing device that generates the image data IDATA and may determine whether a target pixel is a defect pixel based on the information regarding the location of the defect pixel. The image sensing device may store information regarding the location of a fixed defect pixel in an internal repository (e.g., one time programmable (OTP) memory) for a reason in the process and may provide the information regarding the location of the defect pixel to the ISP 100.

According to another embodiment, the defect pixel detector 200 may determine a target pixel to be a defect pixel when a value, that is, a result of comparing the pixel data of the target pixel with the pixel data of each of pixels that correspond to the same color and the same channel as the target pixel, satisfies a preset defect pixel detection condition.

If the defect pixel detector 200 determines the target pixel to be the defect pixel, the defect pixel corrector 300 may correct the pixel data of the target pixel based on the image data of a kernel including the target pixel.

More detailed operations of the defect pixel detector 200 will be described later with reference to FIGS. 4A to 4H.

Figure 2:
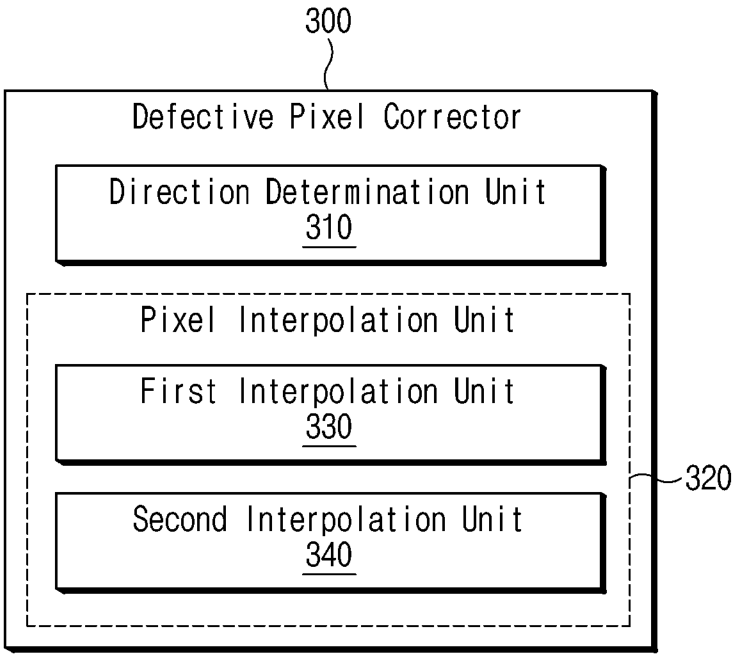
FIG. 2 is a block diagram illustrating more specifically a defect pixel corrector illustrated in FIG. 1.

FIG. 2 is a block diagram illustrating more specifically a defect pixel corrector illustrated in FIG. 1.

Referring to FIG. 2, the defect pixel corrector 300 may include a direction determination unit 310 and a pixel interpolation unit 320.

The direction determination unit 310 may determine the direction of the target kernel by comparing the pixel data of a pair of pixels that are disposed on a line in one direction, among pairs of pixels that correspond to the same color and the same channel.

The pixel interpolation unit 320 may correct the target pixel based on the direction of the target kernel, which has been determined by the direction determination unit 310. For example, if a target pixel included in the target kernel is a defect pixel, the ISP 100 may correct the target pixel based on the pixel data of neighboring pixels that are divided and disposed based on the direction corresponding to the target kernel.

In the present disclosure, it is assumed that an operation of the pixel interpolation unit 320 that corrects a defect pixel is performed in the unit of a 4×4 kernel that includes four rows and four columns.

In the present disclosure, an all 4-coupled (A4C) type sensor is assumed. The A4C sensor may obtain a color image and may simultaneously detect a phase difference in all pixels. The A4C sensor may have a form in which pixels arrayed in a 2×2 matrix form share one microlens. Operations of the ISP 100 according to an embodiment of the present disclosure may be performed based on a pixel array having a Q×Q pattern in which pixels having the same color filter have been arrayed in a 4×4 matrix form. In the present disclosure, the A4C type sensor and the pixel array having the Q×Q pattern may correspond to each other, and four microlenses may correspond to a unit pattern of the pixel array having the Q×Q pattern.

In an example, pixels that have been arrayed in the 2×2 matrix form may correspond to one microlens. Four microlenses may be arrayed in the 2×2 matrix form and may correspond to one unit pattern of the pixel array having the Q×Q pattern. For example, one microlens may correspond to each of the top left, top right, bottom left, and bottom right of the unit pattern of the pixel array having the Q×Q pattern. Accordingly, four microlenses may be disposed to have a 2×2 structure. Each of the unit pattern of the pixel array having the Q×Q pattern may correspond to one of a red (R) color filter, a green (G) color filter, and a blue (B) color filter so that the four unit patterns may form a bayer color array. In another embodiment, one unit pattern of pixels having the 4×4 matrix form may be formed in the pixel array having the Q×Q pattern. In this case, instead of four unit patterns, there may be only one unit pattern, and all of the pixels may be uniform. In other words, all of the pixels may include the R (red), G (green), or B (blue) color filter. Pixels that have been arrayed in the 2×2 matrix form, among the pixels that have been arrayed in the 4×4 matrix form, may share one microlens. That is, four microlenses may be disposed in the pixel array having the Q×Q pattern for each unit pattern that is divided based on the color filter.

When surrounding pixels of a target pixel have similar pixel data, the first pixel interpolation unit 330 may correct the target pixel based on the pixel data of surrounding pixels disposed in a relatively wide range. In an example, when surrounding pixels of a target pixel have similar pixel data, the first pixel interpolation unit 330 may correct the target pixel based on the pixel data of each of the pixels that correspond to the same color and the same channel as the target pixel.

When surrounding pixels of a target pixel have not-similar pixel data, the second pixel interpolation unit 340 may correct the target pixel based on the pixel data of surrounding pixels disposed in a relatively narrow range. Not-similar pixel data may be defined as pixel data that is not the same. For example, the Not-similar pixel may correspond to a pixel in which a difference value of pixel data is greater than or equal to a reference value by comparing pixel data with surrounding pixels. The detailed description will be described below with reference to FIG. 6A. In an example, when surrounding pixels of a target pixel have not-similar pixel data, the second pixel interpolation unit 340 may correct the target pixel based on the pixel data of each of a pixel that neighbors the target pixel and pixels that correspond to the same color and the same channel as the neighboring pixel.

More detailed operations of the defect pixel corrector 300 will be described later with reference to FIG. 5A and drawings subsequent to FIG. 5A.

Figure 3:
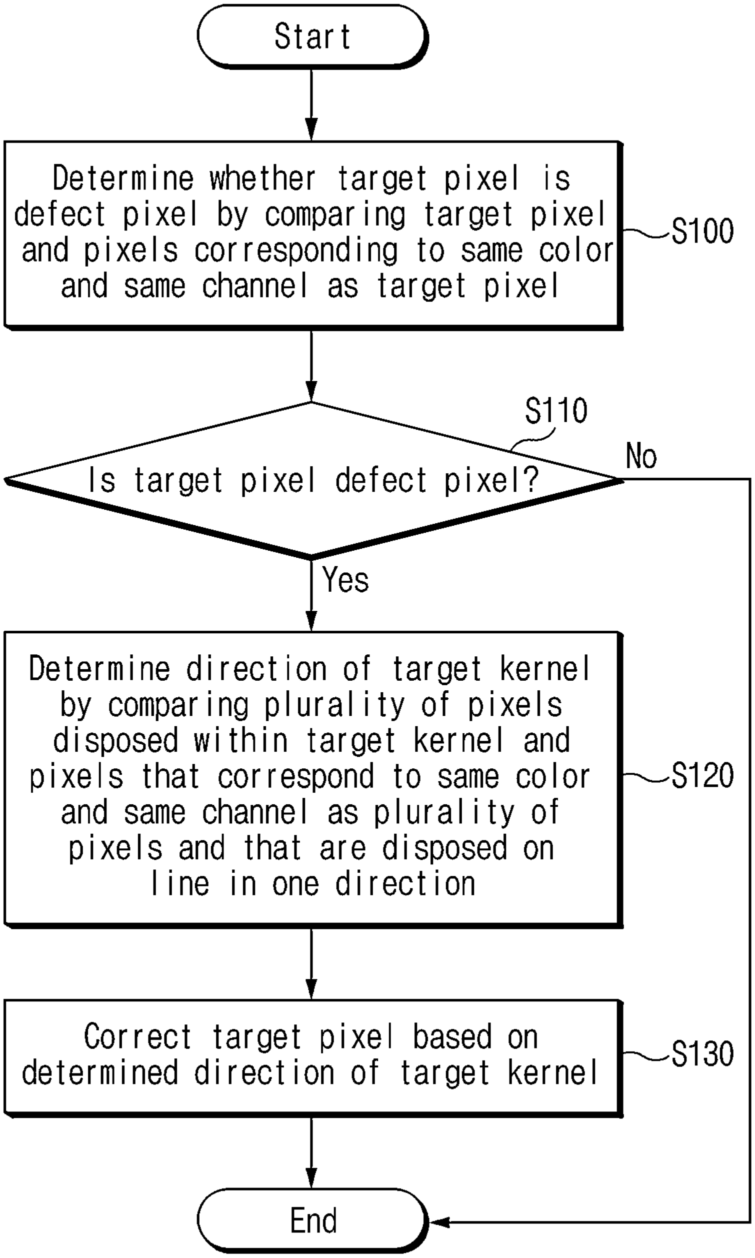
FIG. 3 is a flowchart for describing an operation of the image signal processor according to an embodiment of the present disclosure.

FIG. 3 is a flowchart that describes an operation of the image signal processor according to an embodiment of the present disclosure.

Referring to FIG. 3, the defect pixel detector 200 may determine whether a target pixel is a defect pixel by comparing a target pixel with pixels that correspond to the same color and the same channel as the target pixel (S100). In an embodiment, the defect pixel detector 200 may determine whether a target pixel is a defect pixel by comparing the pixel data of the target pixel included in a target kernel with the pixel data of each of pixels that correspond to the same color and the same channel as the target pixel. In an embodiment, the defect pixel detector 200 may determine whether a target pixel is a defect pixel by comparing the pixel data of the target pixel included in a target kernel with the pixel data of each of the pixels having the same attributes as the target pixel. For example, if the target pixel is a pixel that includes a G color filter and that is disposed in a first channel, the defect pixel detector 200 may extract the pixel data of another pixel that includes a G color filter and that is disposed in the first channel, among pixels included in a target kernel, and may compare the extracted pixel data with the pixel data of the target pixel.

If the target pixel is not a defect pixel (No at S110) based on the determination of whether the target pixel is a defect pixel, the ISP 100 may determine that a separate correction for the defect pixel is not necessary and may terminate the process.

If the target pixel is the defect pixel based on the determination of whether the target pixel is the defect pixel (Yes at S110), the direction determination unit 310 may determine the direction of the target kernel by comparing a plurality of pixels that are disposed within the target kernel with pixels that correspond to the same color and the same channel as the plurality of pixels and that are disposed on a line in one direction (S120). In an embodiment, the direction determination unit 310 may determine the direction of the target kernel by comparing the pixel data of each of the plurality of pixels that are disposed within the target kernel with the pixel data of each of the pixels that correspond to the same color and the same channel as the plurality of pixels. In an embodiment, the direction determination unit 310 may determine the direction of the target kernel by comparing the pixel data of a pair of pixels that are disposed on a line in one direction and that have the same attributes. For example, if a first pixel disposed within the target kernel is a pixel that includes a G color filter and that is disposed in a first channel, the direction determination unit 310 may extract the pixel data of a second pixel that is disposed on a line in a horizontal direction in relation to the first pixel, among pixels that include a G color filter and that are disposed in the first channel, and may compare the extracted pixel data with the pixel data of the first pixel. In this case, the first pixel and the second pixel may correspond to a pair of pixels.

The pixel interpolation unit 320 may correct the target pixel based on the direction of the target kernel, which has been determined by the direction determination unit 310 (S130). In an embodiment, the pixel interpolation unit 320 may interpolate the pixel data of the target pixel by using the pixel data of each of the pixels that are disposed at a location corresponding to the direction of the target kernel. For example, if the direction determination unit 310 determines that the direction of the target kernel is a horizontal direction, the pixel interpolation unit 320 may interpolate the pixel data of the target pixel by using the pixel data of a pixel that corresponds to the same color and the same channel as the target pixel, among the pixels included in the target kernel, and that is disposed in the horizontal direction in relation to the target pixel. For example, if the direction determination unit 310 determines that the direction of the target kernel is the horizontal direction, the pixel interpolation unit 320 may interpolate the pixel data of the target pixel by using the pixel data of a pixel that corresponds to the same color and the same channel as a pixel that neighbors the target pixel, among the pixels included in the target kernel, and that is disposed in the horizontal direction in relation to the target pixel.

FIGS. 4A to 4H each are diagrams for describing examples in which step S100, illustrated in FIG. 3, is performed.

Figure 4A:
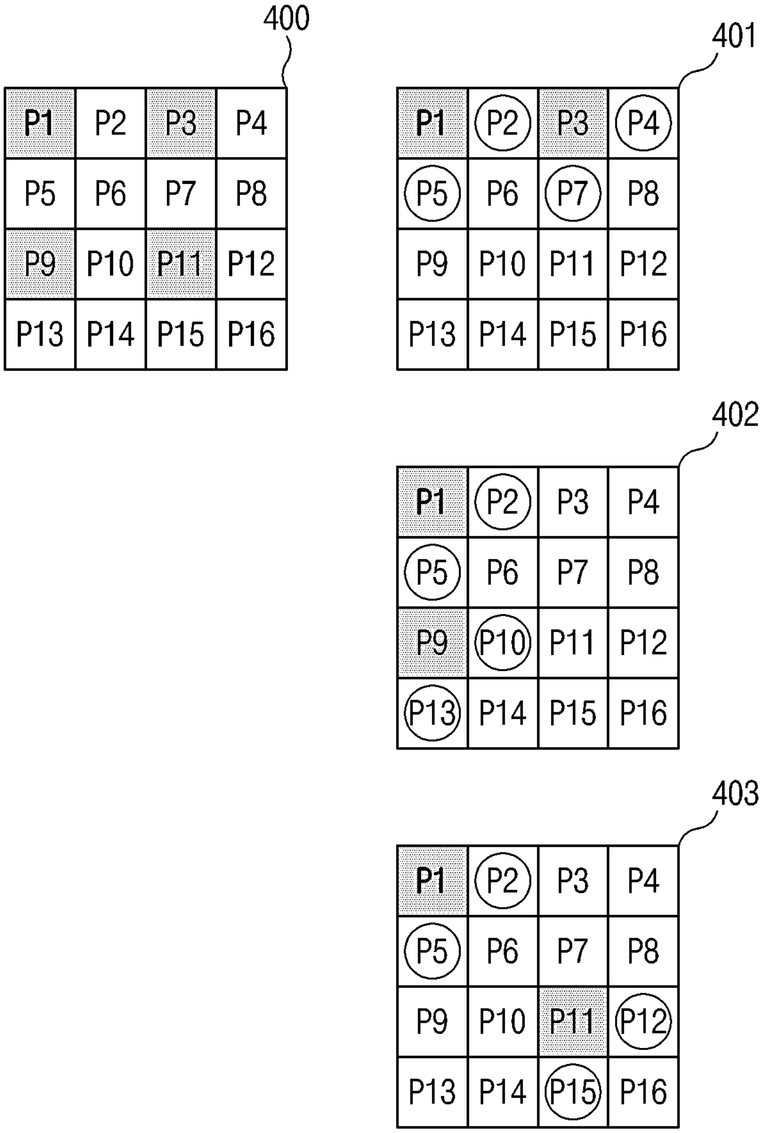
FIGS. 4A to 4H each are diagrams for describing examples in which step S100 illustrated in FIG. 3 is performed.
Figure 4B:
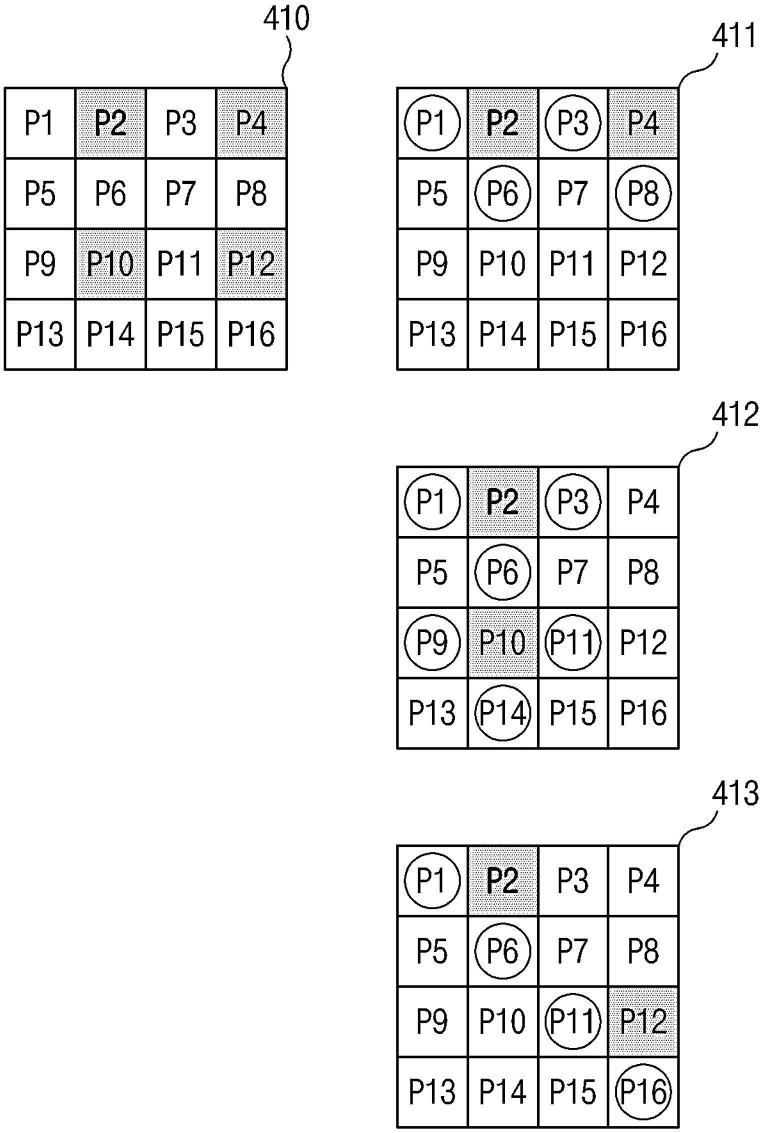
Figure 4C:
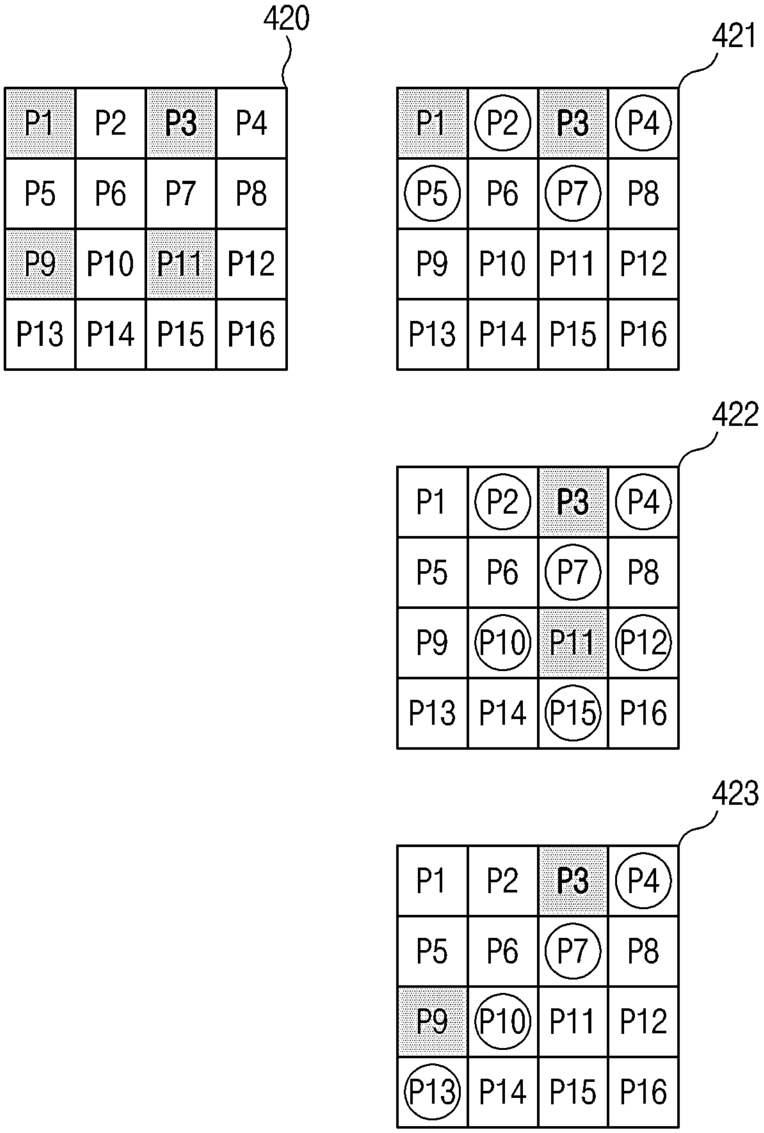
Figure 4D:
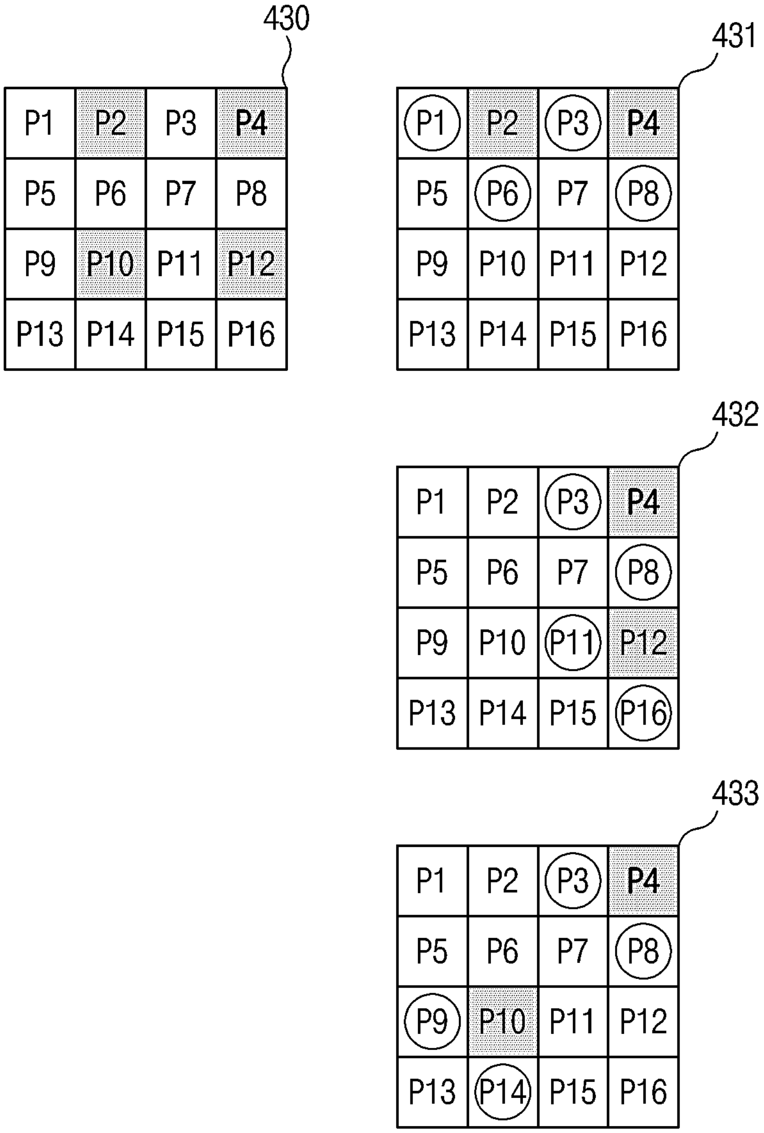
Figure 4E:
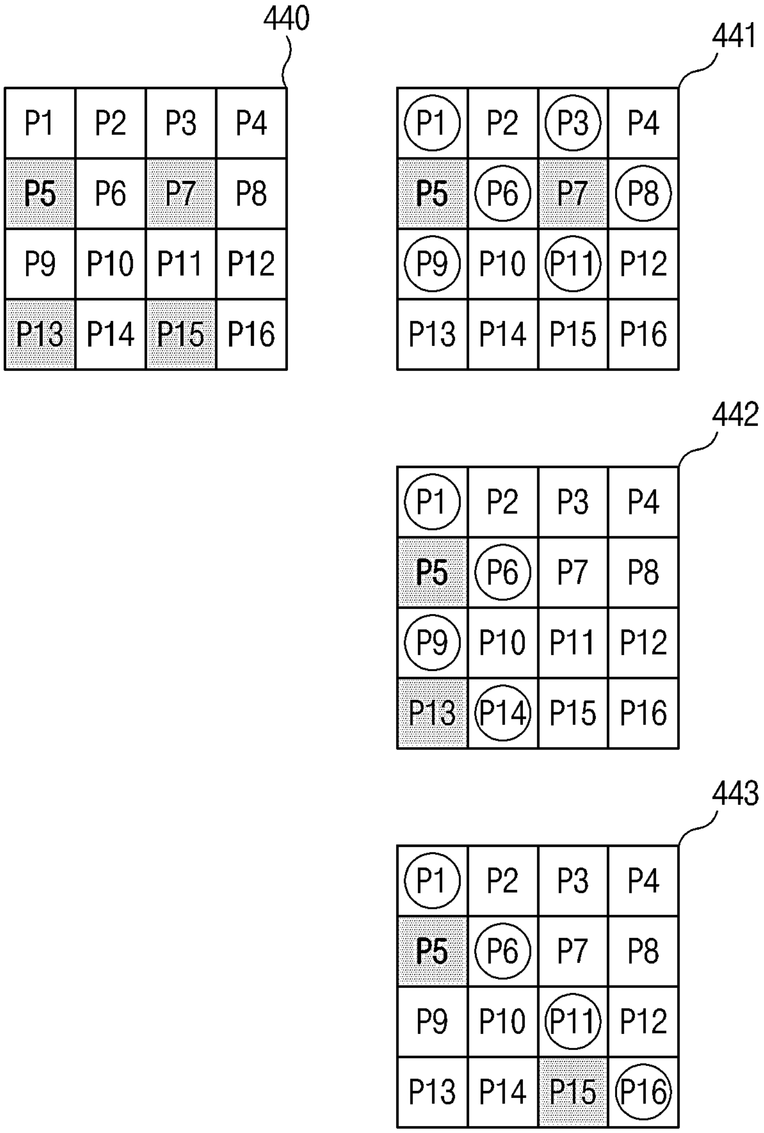
Figure 4F:
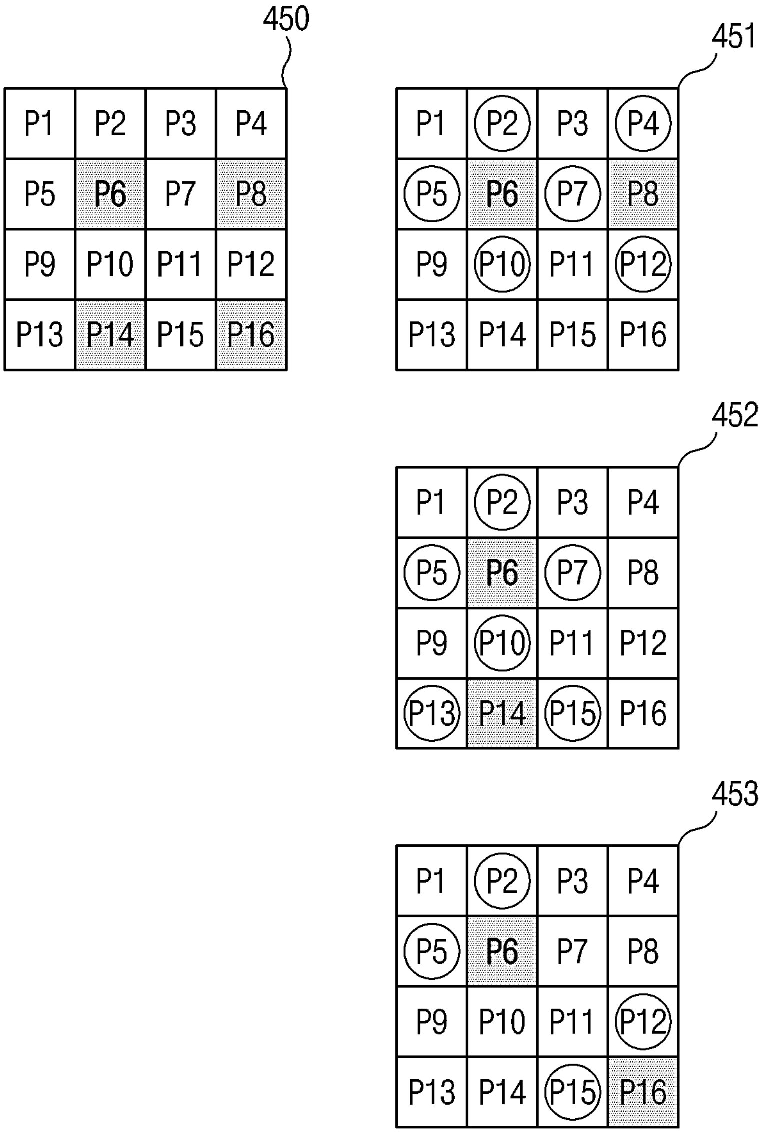
Figure 4G:
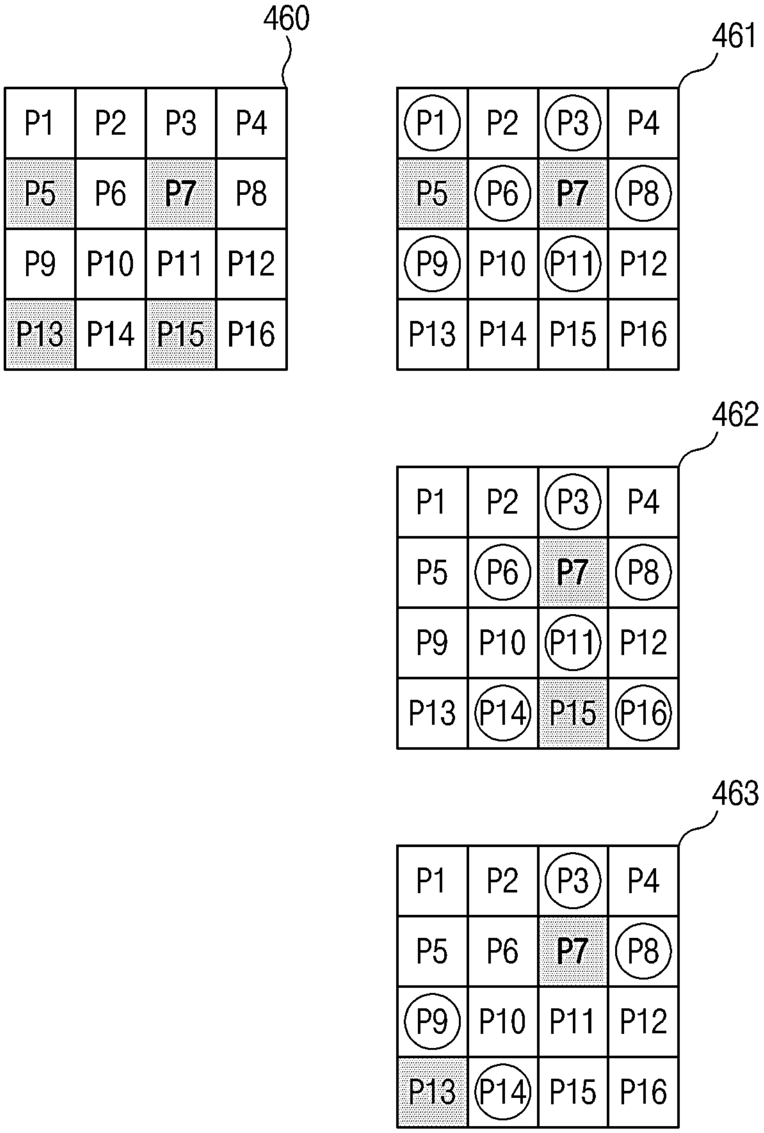
Figure 4H:
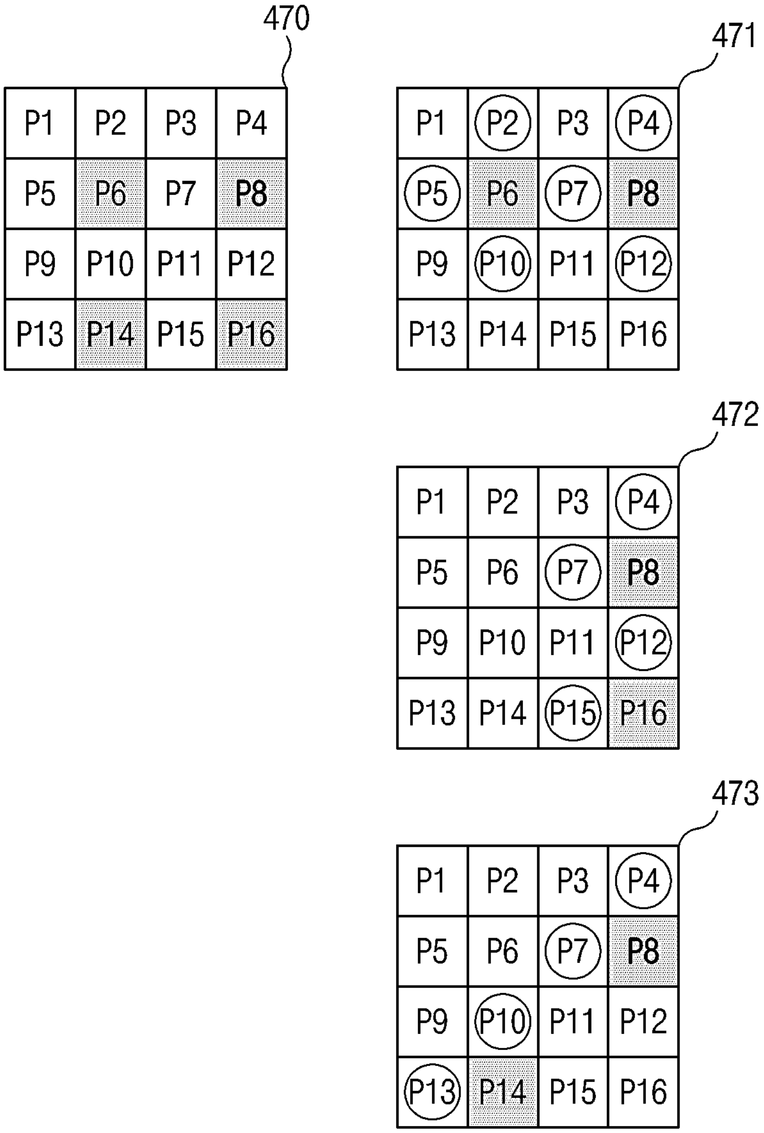

Referring to FIG. 4A, the defect pixel detector 200 may determine whether a target pixel is a defect pixel based on first comparison data (e.g., corresponding to each of portions shaded in FIG. 4A), that is, a result of comparing the pixel data of the target pixel (e.g., corresponding to each of portions bolded in FIG. 4A) included in a target kernel with the pixel data of each of the pixels having the same attributes as the target pixel. For example, the defect pixel detector 200 may determine whether a target pixel P1 is a defect pixel based on first comparison data that are obtained by comparing the pixel data of the target pixel P1 included in a target kernel 400 and the pixel data of each of the pixels P3, P9, and P11 that correspond to the same color and the same channel as the target pixel.

In the present disclosure, the same channel may be defined as the location of a pixel corresponding to the same phase on the basis of a microlens. For example, the target kernel 400 may be a pixel array having a Q×Q pattern. Pixels P1 to P16 may include the same color filter. Furthermore, the pixels P1, P2, P5, and P6 may share a first microlens (not illustrated). The pixels P3, P4, P7, and P8 may share a second microlens (not illustrated). The pixels P9, P10, P13, and P14 may share a third microlens (not illustrated). The pixels P11, P12, P15, and P16 may share a fourth microlens (not illustrated). In this case, the pixels P1, P3, P9, and P11 may correspond to a first channel. The pixels P2, P4, P10, and P12 may correspond to a second channel. The pixels P5, P7, P13, and P15 may correspond to a third channel. The pixels P6, P8, P14, and P16 may correspond to a fourth channel.

In the present disclosure, a preset threshold value may be set based on a standard deviation between pixels corresponding to the same channel. For example, when the pixels P1, P3, P9, and P11 correspond to a first channel, the pixels P2, P4, P10, and P12 correspond to a second channel, the pixels P5, P7, P13, and P15 correspond to a third channel, and the pixels P6, P8, P14, and P16 correspond to a fourth channel, avg_c1=(p1+p3+p9+p11)/4, avg_c2=(p2+p4+p10+p12)/4, avg_c3=(p5+p7+p13+p15)/4, and avg_c4=(p6+p8+p14+p16)/4 may be defined. MAD_p1=abs(avg_c1, p1), MAD_p2=abs(avg_c2, p2), MAD_p3=abs(avg_c1, p3), MAD_p4=abs(avg_c2, p4), MAD_p5=abs(avg_c3, p5), MAD_p6=abs(avg_c4, p6), MAD_p7=abs(avg_c3, p7), MAD_p8=abs(avg_c4, p8), MAD_p9=abs(avg_c1, p9), MAD_p10=abs(avg_c2, p10), MAD_p11=abs(avg_c1, p11), MAD_p12=abs(avg_c2, p12), MAD_p13=abs(avg_c3, p13), MAD_p14=abs(avg_c4, p14), MAD_p15=abs(avg_c3, p15), and MAD_p16=abs(avg_c4, p16) may be defined. MAD_c1=(MAD_p1+MAD_p3+MAD_p9+MAD_p11)/4, MAD_c2=(MAD_p2+MAD_p4+MAD_p10+MAD_p12)/4, MAD_c3=(MAD_p5+MAD_p7+MAD_p13+MAD_p15)/4, and MAD_c4=(MAD_p6+MAD_p8+MAD_p14+MAD_p16)/4 may be defined. In this case, the preset threshold value may be set based on complexity=max(MAD_c1, MAD_c2, MAD_c3, MAD_c4), that is, the complexity of the channel of each pixel.

In an embodiment, the defect pixel detector 200 may determine, as first data, the gradient of the pixel data of the target pixel P1 and the pixel data of each of the pixels P3, P9, and P11 that correspond to the same color and the same channel as the target pixel. Hereinafter, it is assumed that the pixel data of the pixels P1 to P16 are p1 to p16, respectively. For example, the first data may include the values of abs(p1-p3), abs(p1-p9), and abs(p1-p11). In this case, if each of the values included in the first data is greater than a preset threshold value, the defect pixel detector 200 may determine the pixel P1 to be a defect pixel.

In an embodiment, the defect pixel detector 200 may generate third comparison data (e.g., corresponding to each of portions circled in FIG. 4A), that is, a result of comparing the pixel data of each of the neighboring pixels P2 and P5 that neighbor the target pixel P1 with the pixel data of each of the pixels P4, P7, P10, P13, P12, and P15 that correspond to the same color and the same channel as the neighboring pixels P2 and P5 and may determine whether the target pixel is a defect pixel based on a difference value between the first comparison data and the third comparison data. For example, the third comparison data may include the values of abs(p2-p4), abs(p5-p7), abs(p2-p10), abs(p5-p13), abs(p2-p12), and abs(p5-p15).

In an example, the defect pixel detector 200 may determine whether the target pixel P1 is a defect pixel by dividing the difference value between the first comparison data and the third comparison data into a horizontal direction, a vertical direction, and a diagonal direction. For example, the defect pixel detector 200 may calculate the values of abs(abs(p1-p3)−abs(p2-p4)) and abs(abs(p1-p3)−abs(p5-p7)) by extracting (401) pixels to determine a difference value between the first comparison data and the third comparison data in the horizontal direction, may calculate the values of abs(abs(p1-p9)−abs(p2-p10)) and abs(abs(p1-p9)−abs(p5-p13)) by extracting (402) pixels to determine a difference value between the first comparison data and the third comparison data in the vertical direction, and may calculate the values of abs(abs(p1-p11)−abs(p2-p12)) and abs(abs(p1-p11)−abs(p5-p15)) by extracting (403) pixels to determine a difference value between the first comparison data and the third comparison data in the diagonal direction.

In an example, when a value that is calculated by dividing the difference value between the first comparison data and the third comparison data in each of the horizontal direction, the vertical direction, and the diagonal direction is greater than a preset threshold value, the defect pixel detector 200 may determine the target pixel P1 to be a defect pixel. For example, when each of the values of abs(abs(p1-p3)–abs(p2-p4)), abs(abs(p1-p3)–abs(p5-p7)), abs(abs(p1-p9)–abs(p2-p10)), abs(abs(p1-p9)–abs(p5-p13)), abs(abs(p1-p11)–abs(p2-p12)), and abs(abs(p1-p11)–abs(p5-p15)) is greater than the preset threshold value, the defect pixel detector 200 may determine the target pixel P1 to be a defect pixel.

In an example, the defect pixel detector 200 may generate the third comparison data, that is, a result of comparing the pixel data of each of the sharing pixels P2, P5, and P6 that share the microlens with the target pixel P1 with the pixel data of each of the pixels P4, P7, P8, P10, P13, P14, P12, P15, and P16 that correspond to the same color and the same channel as the sharing pixels P2, P5, and P6 and may determine whether the target pixel is a defect pixel based on a difference value between the first comparison data and the third comparison data. For example, the third comparison data may include the values of abs(p2-p4), abs(p5-p7), abs(p6-p8), abs(p2-p10), abs(p5-p13), abs(p6-p14), abs(p2-p12), and abs(p5-p15), and abs(p6-p16).

In an example, the defect pixel detector 200 may determine whether the target pixel P1 is a defect pixel by dividing the difference value between the first comparison data and the third comparison data into a horizontal direction, a vertical direction, and a diagonal direction. For example, the defect pixel detector 200 may calculate the values of abs(abs(p1-p3)–abs(p2-p4)), abs(abs(p1-p3)–abs(p5-p7)), and abs(abs(p1-p3)–abs(p6-p8)) by extracting pixels to determine a difference value between the first comparison data and the third comparison data in the horizontal direction, may calculate the values of abs(abs(p1-p9)–abs(p2-p10)), abs(abs(p1-p9)–abs(p5-p13)), and abs(abs(p1-p9)–abs(p6-p14)) by extracting pixels to determine a difference value between the first comparison data and the third comparison data in the vertical direction, and may calculate the values of abs(abs(p1-p11)–abs(p2-p12)), abs(abs(p1-p11)–abs(p5-p15)), and abs(abs(p1-p11)–abs(p6-p16)) by extracting pixels to determine a difference value between the first comparison data and the third comparison data in the diagonal direction.

In an example, when a value calculated by dividing the difference value between the first comparison data and the third comparison data in each of the horizontal direction, the vertical direction, and the diagonal direction is greater than a preset threshold value, the defect pixel detector 200 may determine the target pixel P1 to be a defect pixel. For example, when each of the values of abs(abs(p1-p3)–abs(p2-p4)), abs(abs(p1-p3)–abs(p5-p7)), abs(abs(p1-p3)–abs(p6-p8)), abs(abs(p1-p9)–abs(p2-p10)), abs(abs(p1-p9)–abs(p5-p13)), abs(abs(p1-p9)–abs(p6-p14)), abs(abs(p1-p11)–abs(p2-p12)), abs(abs(p1-p11)–abs(p5-p15)), and abs(abs(p1-p11)–abs(p6-p16)) is greater than a preset threshold value, the defect pixel detector 200 may determine the target pixel P1 to be a defect pixel.

Referring to FIGS. 4B to 4H, the defect pixel detector 200 may determine whether each of the pixels P2 to P8 is a defect pixel in the same manner as the method of detecting a defect pixel, which is illustrated in FIG. 4A. In an example, the defect pixel detector 200 may determine whether a target pixel is a defect pixel based on first comparison data (e.g., corresponding to each of portions shaded in FIGS. 4B to 4H), that is, a result of comparing the pixel data of the target pixel (e.g., corresponding to each of portions bolded in FIGS. 4B to 4H) included in the target kernel with the pixel data of each of the pixels having the same attributes as the target pixel. For example, the defect pixel detector 200 may determine whether the target pixel P1 is a defect pixel based on the first comparison data, that is, a result of comparing the pixel data of the target pixel included in the target kernel 400 with the pixel data of each of the pixels that correspond to the same color and the same channel as the target pixel.

In an example, the defect pixel detector 200 may generate third comparison data (e.g., corresponding to each of portions circled in FIGS. 4B to 4H) that are obtained by comparing the pixel data of a neighboring pixel that neighbors each of the target pixels P2 to P8 and the pixel data of each of the pixels corresponding to the same color and the same channel as the neighboring pixel and may determine whether the target pixel is a defect pixel based on a difference value between the first comparison data and the third comparison data. A detailed method of the defect pixel detector 200 corresponding to each of FIGS. 4B to 4H may be understood as being the same as the method disclosed in FIG. 4A.

Figure 5A:
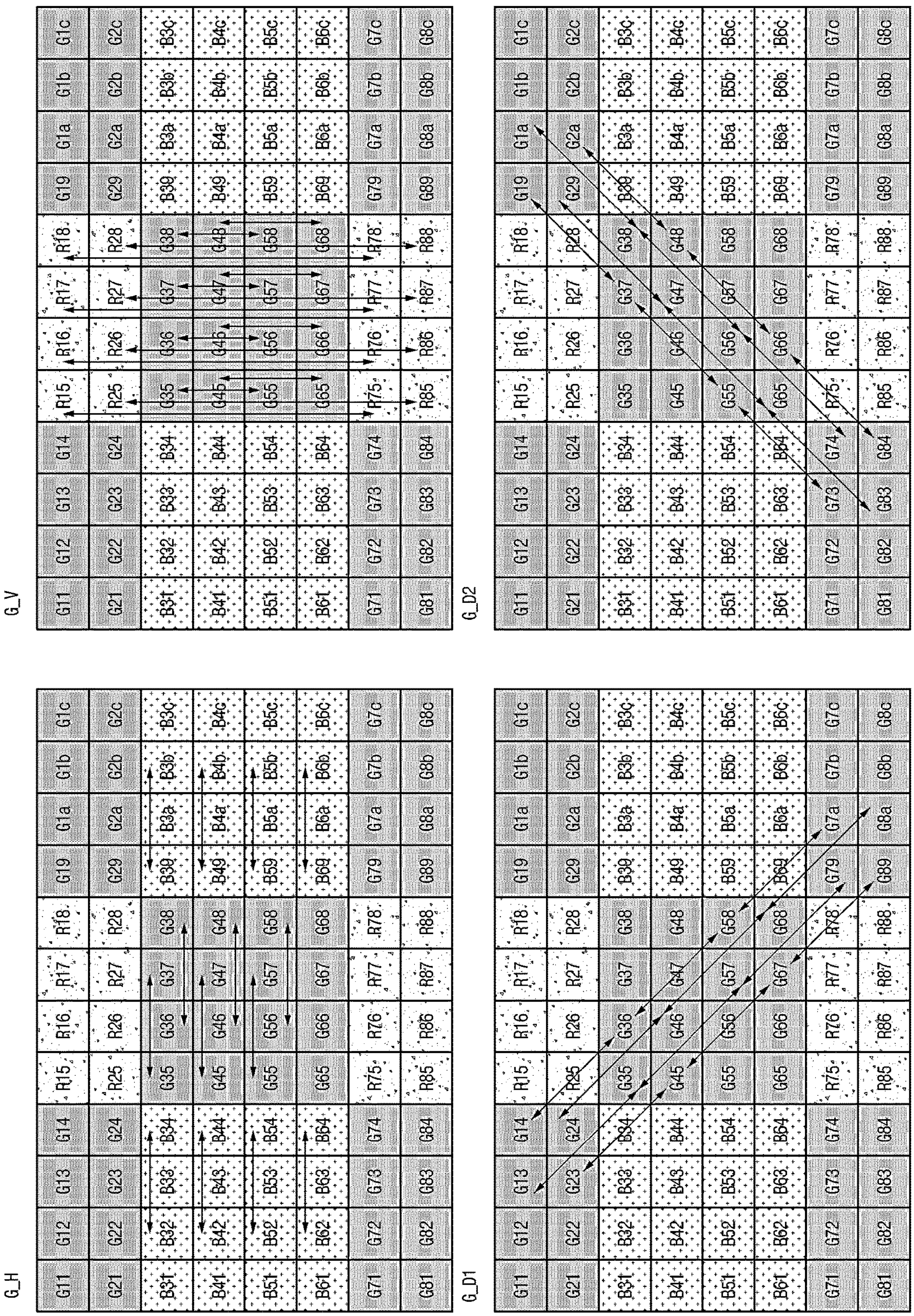
FIGS. 5A to 5C each are diagrams for describing examples in which step S120 illustrated in FIG. 3 is performed.
Figure 5B:
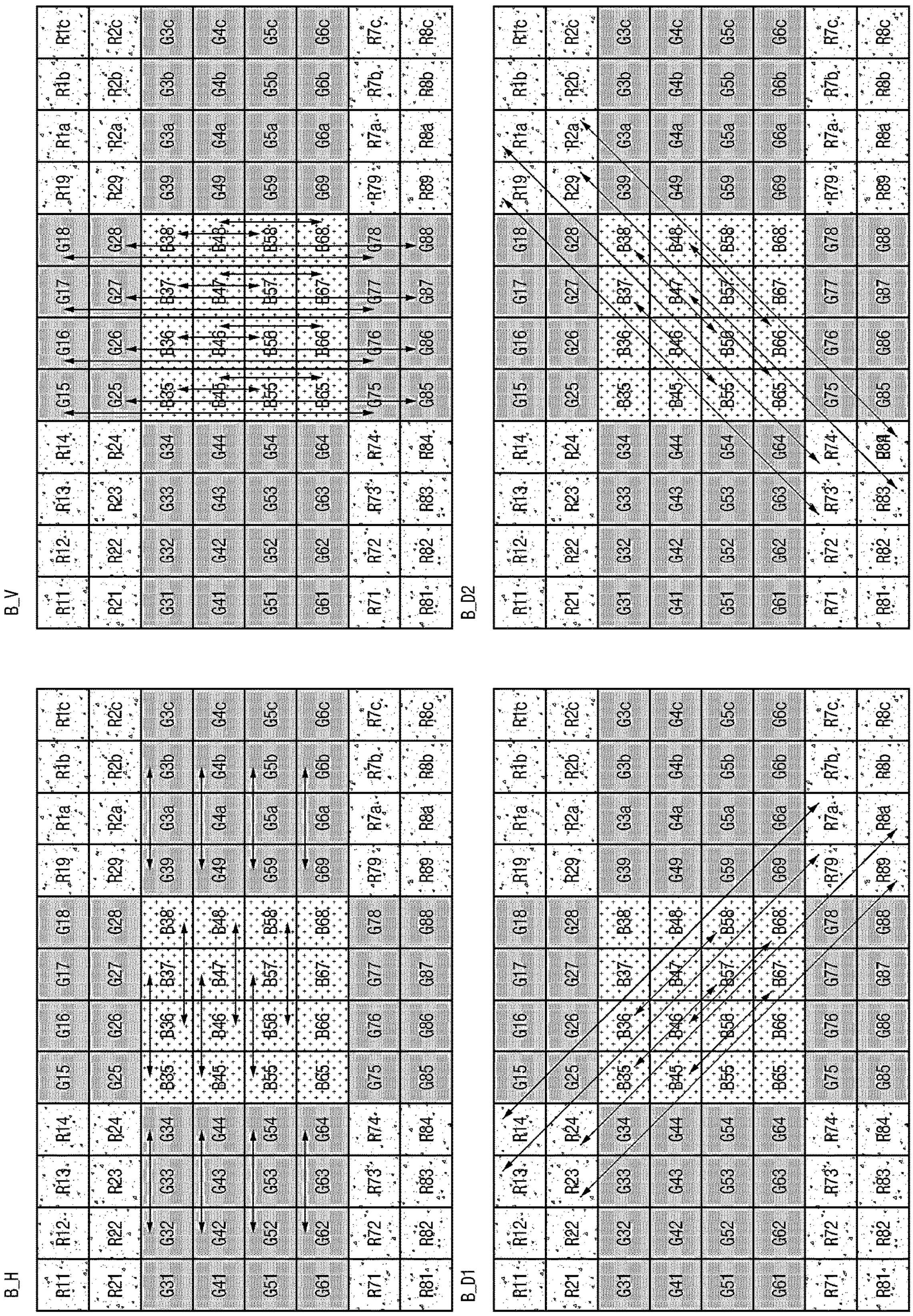
Figure 5C:
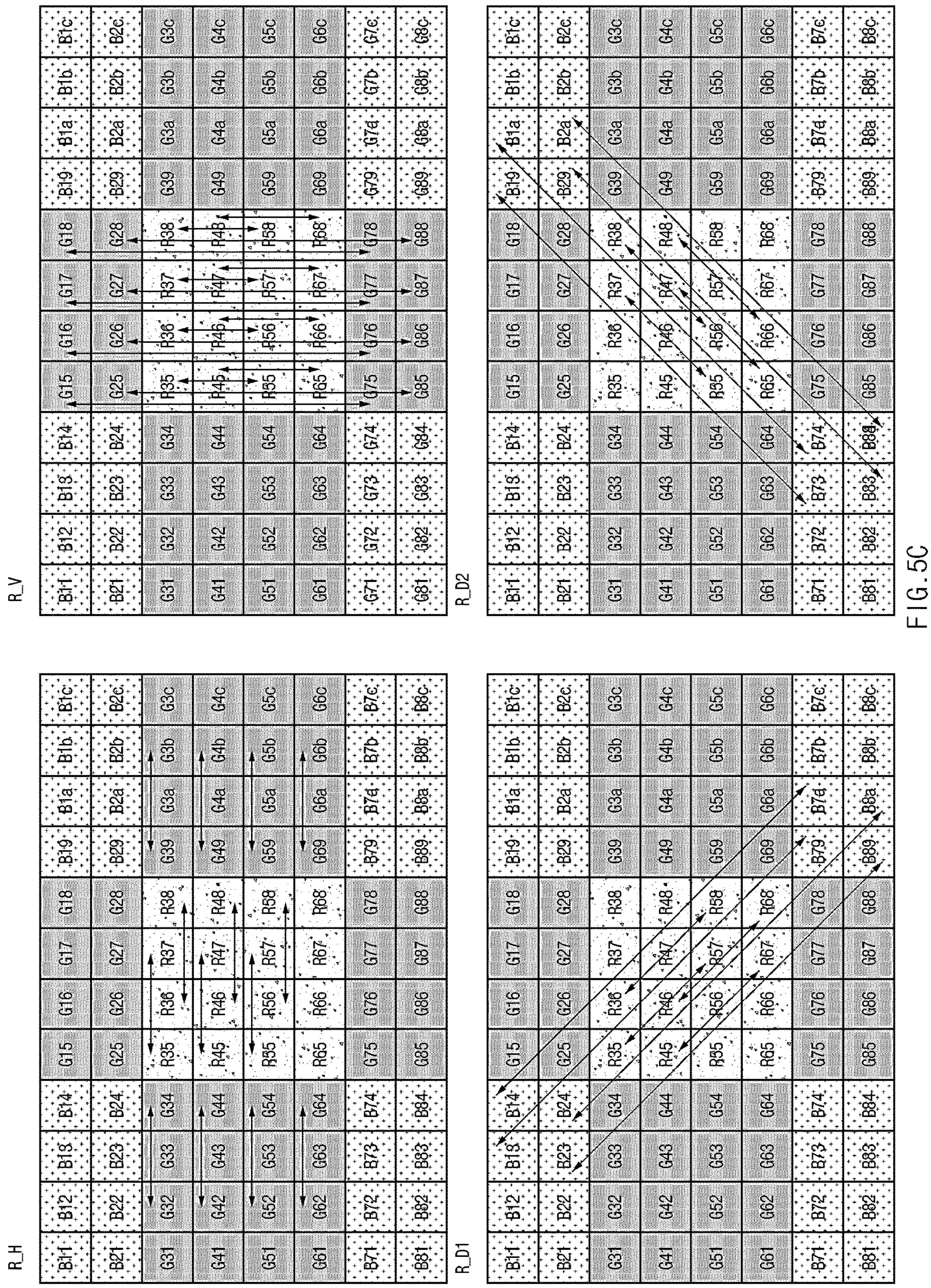

FIGS. 5A to 5C each are diagrams for describing examples in which step S120, illustrated in FIG. 3, is performed.

Referring to FIG. 5A, the direction determination unit 310 included in the defect pixel corrector 300 may determine the direction of a target kernel based on second comparison data (e.g., corresponding to portions indicated by arrows), that is, a result of a comparison between the pixel data of a pair of pixels that are disposed on a line in one direction, among pairs of pixels having the same attributes. For example, the direction determination unit 310 may determine the direction of the target kernel based on the second comparison data, that is, a result of a comparison between the pixel data of a pair of pixels that are disposed on a line in one direction, among pairs of pixels that correspond to the same color and the same channel as the target pixel.

In the present disclosure, referring to FIG. 5A, it is assumed that an operation of the direction determination unit 310 determining the direction of the target kernel is performed in the unit of the 8×12 kernel which includes 8 rows and 12 columns and in which pixels including a G color filter are disposed in third to sixth rows and fifth to eighth columns.

In an embodiment, the direction determination unit 310 may determine, as second data, the sum of differences between the pixel data of each of a plurality of pixels disposed in the 8×12 kernel and the pixel data of each of the pixels that correspond to the same color and the same channel as the plurality of pixels and that are disposed in a horizontal direction, a vertical direction, and a slash direction, and a backslash direction of the plurality of pixels. The slash direction may be defined as a diagonal direction from the bottom left to the top right and vice versa, and the backslash direction may be defined as a diagonal direction from the top left to the bottom right and vice versa. Hereinafter, it is assumed that the pixel data of G11 to G8c are g11 to g8c, respectively.

In an embodiment, in order to determine whether the direction of the target kernel corresponds to the horizontal direction, the direction determination unit 310 may use a gradient between the pixel data of each of the plurality of pixels and the pixel data of each of the pixels that correspond to the same color and the same channel as the plurality of pixels and that are disposed in the horizontal direction in relation to the plurality of pixels. For example, referring to G_H, the direction determination unit 310 may determine the sum of values of abs(b32-b34), abs(g35-g37), abs(g36-g38), abs(b39-b3b), abs(b42-b44), abs(g45-g47), abs(g46-g48), abs(b49-b4b), abs(b52-b54), abs(g55-g57), abs(g56-g58), abs(b59-b5b), abs(b62-b64), abs(g65-g67), abs(g66-g68), and abs(b69-b6b) as the second data corresponding to the horizontal direction.

In an example, in order to determine whether the direction of the target kernel corresponds to the vertical direction, the direction determination unit 310 may use a gradient between the pixel data of each of the plurality of pixels and the pixel data of each of the pixels that correspond to the same color and the same channel as the plurality of pixels and that are disposed in the vertical direction in relation to the plurality of pixels. For example, referring to G_V, the direction determination unit 310 may determine the sum of values of abs(r15-r75), abs(r25-r85), abs(g35-g55), abs(g45-g65), abs (r16-r76), abs(r26-r86), abs(g36-g56), abs(g46-g66), abs (r17-r77), abs(r27-r87), abs(g37-g57), abs(g47-g67), abs (r18-r78), abs(r28-r88), abs(g38-g58), and abs(g48-g68) as the second data corresponding to the vertical direction.

In an example, in order to determine whether the direction of the target kernel corresponds to the backslash direction, the direction determination unit 310 may use a gradient between the pixel data of each of the plurality of pixels and the pixel data of each of the pixels that correspond to the same color and the same channel as the plurality of pixels and that are disposed in the backslash direction of the plurality of pixels. For example, referring to G_D1, the direction determination unit 310 may determine the sum of values of abs(g13-g35), abs(g35-g57), abs(g57-g79), abs (g14-g36), abs(g36-g58), abs(g58-g7a), abs(g23-g45), abs (g45-g67), abs(g67-g89), abs(g24-g46), abs(g46-g68), and abs(g68-g8a) as the second data corresponding to the backslash direction.

In an example, in order to determine whether the direction of the target kernel corresponds to the slash direction, the direction determination unit 310 may use a gradient between the pixel data of each of the plurality of pixels and the pixel data of each of the pixels that correspond to the same color and the same channel as the plurality of pixels and that are disposed in the slash direction of the plurality of pixels. For example, referring to G_D2, the direction determination unit 310 may determine the sum of values of abs(g19-g37), abs(g37-g55), abs(g55-g73), abs(g1a-g38), abs(g38-g56), abs(g56-g74), abs(g29-g47), abs(g47-g65), abs(g65-g83), abs(g2a-g48), abs(g48-g66), and abs(g66-g84) as the second data corresponding to the slash direction.

In an example, in order to determine whether the direction of the target kernel corresponds to a horizontal backslash direction, the direction determination unit 310 may use a gradient between the pixel data of each of the plurality of pixels and the pixel data of each of the pixels that correspond to the same color and the same channel as the plurality of pixels and that are disposed in the horizontal backslash direction of the plurality of pixels. The horizontal backslash direction may be defined as a direction that has an angle between that of the horizontal direction and the backslash direction. For example, the direction determination unit 310 may determine the sum of values of abs(g11-g35), abs(g12-g36), abs(g13-g37), abs(g14-g38), abs(g21-g45), abs(g22-g46), abs(g23-g47), abs(g24-g48), abs(g55-g79), abs(g56-g7a), abs(g57-g7b), abs(g58-g7c), abs(g65-g89), abs(g66-g8a), abs(g67-g8b), and abs(g68-g8c) as the second data corresponding to the horizontal backslash direction.

In an example, in order to determine whether the direction of the target kernel corresponds to a vertical backslash direction, the direction determination unit 310 may use a gradient between the pixel data of each of the plurality of pixels and the pixel data of each of the pixels that correspond to the same color and the same channel as the plurality of pixels and that are disposed in the vertical backslash direction of the plurality of pixels. The vertical backslash direction may be defined as a direction that has an angle between that of the vertical direction and the backslash direction. For example, the direction determination unit 310 may determine the sum of values of abs(g13-g55), abs(g14-g56), abs(g23-g65), abs(g24-g66), abs(g37-g79), abs(g38-g7a), abs(g47-g89), and abs(g48-g8c) as the second data corresponding to the vertical backslash direction.

In an example, in order to determine whether the direction of the target kernel corresponds to a horizontal slash direction, the direction determination unit 310 may use a gradient between the pixel data of each of the plurality of pixels and the pixel data of each of the pixels that correspond to the same color and the same channel as the plurality of pixels and that are disposed in the horizontal slash direction of the plurality of pixels. The horizontal slash direction may be defined as a direction that has an angle between that of the horizontal direction and the slash direction. For example, the direction determination unit 310 may determine the sum of values of abs(g08-g24), abs(g09-g25), abs(g0a-g26), abs (g0b-g27), abs(g18-g34), abs(g19-g35), abs(g1a-g36), abs (g1b-g37), abs(g44-g60), abs(g45-g61), abs(g46-g62), abs (g47-g63), abs(g54-g70), abs(g55-g71), abs(g56-g72), and abs(g57-g73) as the second data corresponding to the horizontal slash direction.

In an example, in order to determine whether the direction of the target kernel corresponds to a vertical slash direction, the direction determination unit 310 may use a gradient between the pixel data of each of the plurality of pixels and the pixel data of each of the pixels that correspond to the same color and the same channel as the plurality of pixels and that are disposed in the vertical slash direction of the plurality of pixels. The vertical slash direction may be defined as a direction that has an angle between that of the vertical direction and the slash direction. For example, the direction determination unit 310 may determine the sum of values of abs(g08-g46), abs(g09-g47), abs(g18-g56), abs (g19-g57), abs(g24-g62), abs(g25-g63), abs(g34-g72), and abs(g35-g73) as the second data corresponding to the vertical slash direction.

In an example, the direction determination unit 310 may determine the lowest value, among the second data corresponding to the horizontal direction, the vertical direction, the backslash direction, the slash direction, the horizontal backslash direction, the vertical backslash direction, the horizontal slash direction, and the vertical slash direction, as the direction of the target kernel. For example, if values corresponding to the horizontal direction, the vertical direction, the backslash direction, the slash direction, the horizontal backslash direction, the vertical backslash direction, the horizontal slash direction, and the vertical slash direction, among the second data, are 1, 1, 1, 0, 1, 2, 1, and 1, respectively, the direction determination unit 310 may determine the direction of the target kernel as the slash direction.

In an example, if the lowest values, among the second data corresponding to the horizontal direction, the vertical direction, the backslash direction, the slash direction, the horizontal backslash direction, the vertical backslash direction, the horizontal slash direction, and the vertical slash direction, are plural, the direction determination unit 310 may determine, as the direction of the target kernel, a direction corresponding to one of the lowest values. For example, if values corresponding to the horizontal direction, the vertical direction, the backslash direction, the slash direction, the horizontal backslash direction, the vertical backslash direction, the horizontal slash direction, and the vertical slash direction, among the second data, are 1, 1, 0, 0, 1, 2, 1, and 1, respectively, the direction determination unit 310 may determine the direction of the target kernel as the backslash direction.

In an example, if the lowest values, among the second data corresponding to the horizontal direction, the vertical direction, the backslash direction, the slash direction, the horizontal backslash direction, the vertical backslash direction, the horizontal slash direction, and the vertical slash direction, are plural, the direction determination unit 310 may determine that the direction of the target kernel cannot be specified, and may determine the pixel data of a defect pixel as an average value of the pixel data of surrounding pixels. For example, if values corresponding to the horizontal direction, the vertical direction, the backslash direction, the slash direction, the horizontal backslash direction, the vertical backslash direction, the horizontal slash direction, and the vertical slash direction, among the second data, are 1, 1, 0, 0, 1, 2, 1, and 1, respectively, the direction determination unit 310 may determine that the direction of the target kernel cannot be specified and may determine, as the pixel data of a defect pixel, an average value of the pixel data of pixels that neighbor the defect pixel.

Referring to FIG. 5B, the direction determination unit 310 included in the defect pixel corrector 300 may determine the direction of the target kernel based on second comparison data (e.g., corresponding to portions indicated by arrows), that is, a result of a comparison between the pixel data of a pair of pixels that are disposed on a line in one direction, among pairs of pixels having the same attributes. For example, the direction determination unit 310 may determine the direction of the target kernel based on the second comparison data, that is, a result of a comparison between the pixel data of a pair of pixels that are disposed on a line in one direction, among pairs of pixels that correspond to the same color and the same channel.

In the present disclosure, referring to FIG. 5B, it is assumed that an operation of the direction determination unit 310 determining the direction of the target kernel is performed in the unit of an 8×12 kernel which includes 8 rows and 12 columns and in which pixels including a B color filter are disposed in third to sixth rows and fifth to eighth columns.

In an embodiment, the direction determination unit 310 may determine, as second data, the sum of difference values between the pixel data of each of the plurality of pixels disposed in the 8×12 kernel and the pixel data of each of the pixels that correspond to the same color and the same channel as the plurality of pixels and that are disposed in horizontal direction, vertical direction, slash direction, and backslash direction of the plurality of pixels. Hereinafter, it is assumed that the pixel data of R11 to R8c are r11 to r8c, respectively.

In an embodiment, in order to determine whether the direction of the target kernel corresponds to the horizontal direction, the direction determination unit 310 may use a gradient between the pixel data of each of the plurality of pixels and the pixel data of each of the pixels that correspond to the same color and the same channel as the plurality of pixels and that are disposed in the horizontal direction in relation to the plurality of pixels. For example, referring to B_H, the direction determination unit 310 may determine the sum of values of abs(g32-g34), abs(b35-b37), abs(b36-b38), abs(g39-g3b), abs(g42-g44), abs(b45-b47), abs(b46-b48), abs(g49-g4b), abs(g52-g54), abs(b55-b57), abs(b56-b58), abs(g59-g5b), abs(g62-g64), abs(b65-b67), abs(b66-b68), and abs(g69-g6b) as the second data corresponding to the horizontal direction.

In an embodiment, in order to determine whether the direction of the target kernel corresponds to the vertical direction, the direction determination unit 310 may use a gradient between the pixel data of each of the plurality of pixels and the pixel data of each of the pixels that correspond to the same color and the same channel as the plurality of pixels and that are disposed in the vertical direction in relation to the plurality of pixels. For example, referring to B_V, the direction determination unit 310 may determine the sum of values of abs(g15-g75), abs(g25-g85), abs(b35-b55), abs(b45-b65), abs(g16-g76), abs(g26-g86), abs(b36-b56), abs(b46-b66), abs(g17-g77), abs(g27-g87), abs(b37-b57), abs(b47-b67), abs(g18-g78), abs(g28-g88), abs(b38-b58), and abs(b48-b68) as the second data corresponding to the vertical direction.

In an embodiment, in order to determine whether the direction of the target kernel corresponds to the backslash direction, the direction determination unit 310 may use a gradient between the pixel data of each of the plurality of pixels and the pixel data of each of the pixels that correspond to the same color and the same channel as the plurality of pixels and that are disposed in the backslash direction of the plurality of pixels. For example, referring to B_D1, the direction determination unit 310 may determine the sum of values of abs(r13-r79), abs(r14-r7a), abs(r23-r89), abs(r24-r8a), abs(b35-b57), abs(b36-b58), abs(b45-b67), and abs (b46-b68) as the second data corresponding to the backslash direction.

In an embodiment, in order to determine whether the direction of the target kernel corresponds to the slash direction, the direction determination unit 310 may use a gradient between the pixel data of each of the plurality of pixels and the pixel data of each of the pixels that correspond to the same color and the same channel as the plurality of pixels and that are disposed in the slash direction of the plurality of pixels. For example, referring to B_D2, the direction determination unit 310 may determine the sum of values of abs(r19-r73), abs(r1a-r74), abs(r29-r83), abs(r2a-r84), abs (b37-b55), abs(b38-b56), abs(b47-b65), and abs(b48-b66) as the second data corresponding to the slash direction.

In an embodiment, in order to determine whether the direction of the target kernel corresponds to a horizontal backslash direction, the direction determination unit 310 may use a gradient between the pixel data of each of the plurality of pixels and the pixel data of each of the pixels that correspond to the same color and the same channel as the plurality of pixels and that are disposed in the horizontal backslash direction of the plurality of pixels. The horizontal backslash direction may be defined as a direction that has an angle between that of the horizontal direction and the backslash direction. For example, the direction determination unit 310 may determine the sum of values of abs(g15-g39), abs(g16-g3a), abs(g17-g3b), abs(g18-g3c), abs(g25-g49), abs(g26-g4a), abs(g27-g4b), abs(g28-g4c), abs(g51-g75), abs(g52-g76), abs(g53-g77), abs(g54-g78), abs(g61-g85), abs(g62-g86), abs(g63-g87), and abs(g64-g88) as the second data corresponding to the horizontal backslash direction.

In an embodiment, in order to determine whether the direction of the target kernel corresponds to a vertical backslash direction, the direction determination unit 310 may use a gradient between the pixel data of each of the plurality of pixels and the pixel data of each of the pixels that correspond to the same color and the same channel as the plurality of pixels and that are disposed in the vertical backslash direction of the plurality of pixels. The vertical backslash direction may be defined as a direction that has an angle between that of the vertical direction and the backslash direction. For example, the direction determination unit 310 may determine the sum of values of abs(g17-g59), abs(g18-g5a), abs(g27-g69), abs(g28-g6a), abs(g33-g75), abs(g34-g77), abs(g43-g85), and abs(g44-g86) as the second data corresponding to the vertical backslash direction.

In an example, in order to determine whether the direction of the target kernel corresponds to a horizontal slash direction, the direction determination unit 310 may use a gradient between the pixel data of each of the plurality of pixels and the pixel data of each of the pixels that correspond to the same color and the same channel as the plurality of pixels and that are disposed in the horizontal slash direction of the plurality of pixels. The horizontal slash direction may be defined as a direction that has an angle between that of the horizontal direction and the slash direction. For example, the direction determination unit 310 may determine the sum of values of abs(g15-g31), abs(g16-g32), abs(g17-g33), abs (g18-g34), abs(g25-g41), abs(g26-g42), abs(g27-g43), abs (g28-g44), abs(g59-g75), abs(g5a-g76), abs(g5b-g77), abs (g5c-g78), abs(g69-g85), abs(g6a-g86), abs(g6b-g87), and abs(g6c-g88) as the second data corresponding to the horizontal slash direction.

In an example, in order to determine whether the direction of the target kernel corresponds to a vertical slash direction, the direction determination unit 310 may use a gradient between the pixel data of each of the plurality of pixels and the pixel data of each of the pixels that correspond to the same color and the same channel as the plurality of pixels and that are disposed in the vertical slash direction of the plurality of pixels. The vertical slash direction may be defined as a direction that has an angle between that of the vertical direction and the slash direction. For example, the direction determination unit 310 may determine the sum of values of abs(g15-g53), abs(g16-g54), abs(g25-g63), abs (g26-g64), abs(g39-g77), abs(g3a-g78), abs(g49-g87), and abs(g4a-g88) as the second data corresponding to the vertical slash direction.

In an example, the direction determination unit 310 may determine the lowest value, among the second data corresponding to the horizontal direction, the vertical direction, the backslash direction, the slash direction, the horizontal backslash direction, the vertical backslash direction, the horizontal slash direction, and the vertical slash direction, as the direction of the target kernel. For example, if values corresponding to the horizontal direction, the vertical direction, the backslash direction, the slash direction, the horizontal backslash direction, the vertical backslash direction, the horizontal slash direction, and the vertical slash direction, among the second data, are 1, 2, 2, 3, 2, 2, 4, and 3, respectively, the direction determination unit 310 may determine the direction of the target kernel as the horizontal direction.

Referring to FIG. 5C, the direction determination unit 310 included in the defect pixel corrector 300 may determine the direction of the target kernel in the same manner as the method of determining the direction of the target kernel, which is illustrated in FIG. 5B. In an example, a detailed method of the direction determination unit 310, which corresponds to FIG. 5C, may be understood in the same manner as the method disclosed with reference to FIG. 5B by using the locations of the pixels corresponding to the arrows in B_H, B_V, B_D1, and B_D2, illustrated in FIG. 5B, without any change.

In an embodiment, the detailed method of the direction determination unit 310, which corresponds to FIG. 5C, may be understood in the same manner as the method disclosed with reference to FIG. 5B by using the location of the pixels corresponding to the determinations of the horizontal backslash, vertical backslash, horizontal slash, and vertical slash directions, illustrated in FIG. 5B, without any change.

FIGS. 6A to 6H, each, are diagrams for describing examples in which step S130 illustrated in FIG. 3 is performed.

Figure 6A:
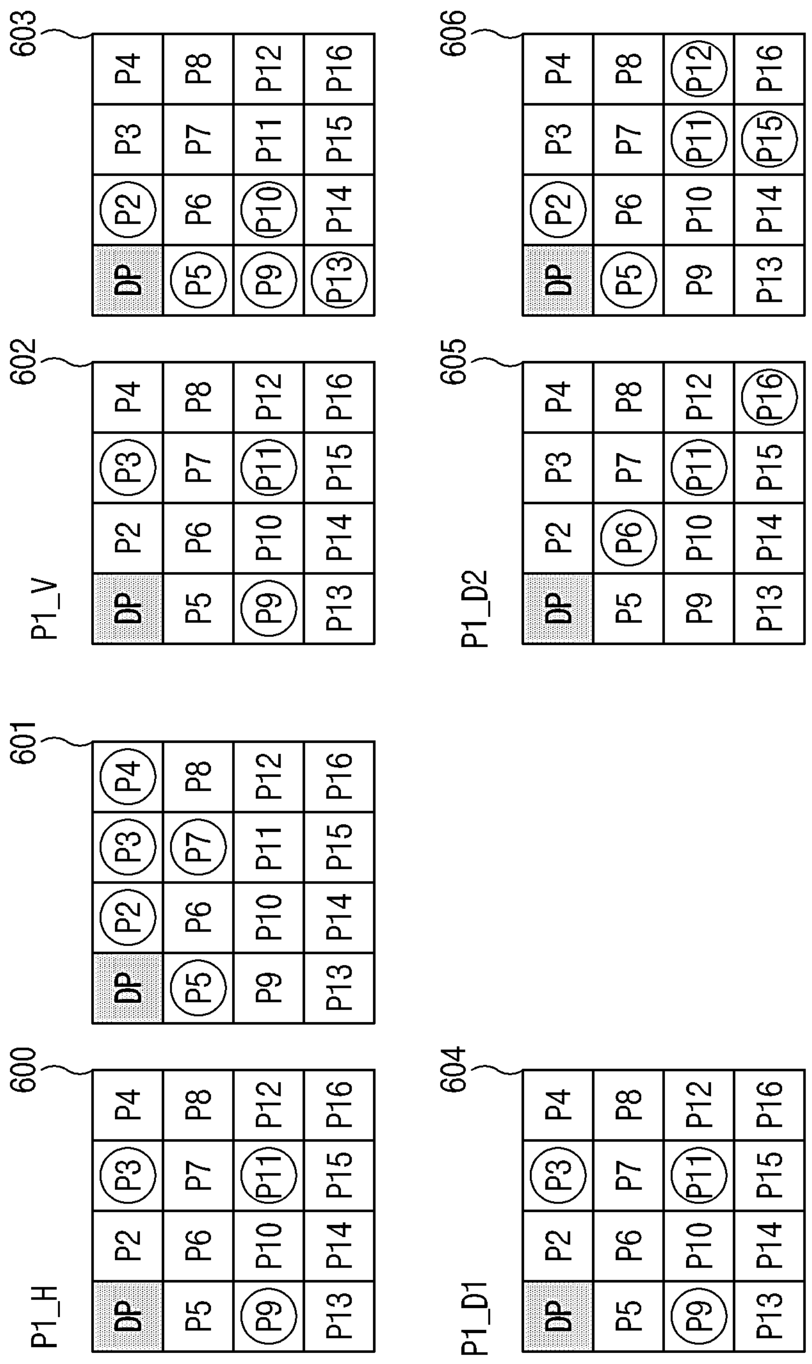
FIGS. 6A to 6H each are diagrams for describing examples in which step S130 illustrated in FIG. 3 is performed.

Referring to FIG. 6A, the pixel interpolation unit 320 may include a first pixel interpolation unit 330 and a second pixel interpolation unit 340 and may interpolate the pixel data of the target pixel (e.g., corresponding to each of portions bolded in FIG. 6A) by using the pixel data of each of the pixels (e.g., corresponding to portions circled in FIG. 6A) that are disposed at locations corresponding to the direction of a target kernel 600, which has been determined by the direction determination unit 310. In an embodiment, if pixels included in the target kernel are similar, the pixel interpolation unit 320 may interpolate the pixel data of the target pixel by using a gradient between the pixel data of the target pixel, that is, a defect pixel DP, and the pixel data of each of the pixels having the same attributes as the target pixel. If pixels included in the target kernel are not similar, the pixel interpolation unit 320 may interpolate the pixel data of the target pixel by using a gradient between the pixel data of a neighboring pixel that neighbors the target pixel, that is, the defect pixel DP, and the pixel data of each of the pixels having the same attributes as the neighboring pixel. In this case, the same attributes may be attributes corresponding to the same color and the same channel.

In the present disclosure, in order to determine the similarity of a target kernel, the pixel interpolation unit 320 may determine the similarity of the target kernel by attributing a first logic level or a second logic level based on a difference value between the pixel data of pixels having the same attributes as the target pixel and may determine pixels that are used to interpolate the pixel data of the target pixel based on the attributed logic level.

In an embodiment, if the direction of the target kernel, which has been determined by the direction determination unit 310, is a horizontal direction, the pixel interpolation unit 320 may interpolate the pixel data of the target pixel, that is, the defect pixel DP, by using the pixel data of each of the pixels indicated in P1_H. In this case, when the attributed logic level between the pixels is the first logic level, the pixel interpolation unit 320 may interpolate the pixel data of the defect pixel DP by using the pixel data of each of the pixels indicated in the target kernel 600. Furthermore, when the attributed logic level is the second logic level, the pixel interpolation unit 320 may interpolate the pixel data of the defect pixel DP by using the pixel data of each of the pixels indicated in a target kernel 601. Hereinafter, it is assumed that the pixel data of pixels P2 to P16 are p2 to p16, respectively. For example, if the direction of the target kernel, which has been determined by the direction determination unit 310, is a horizontal direction, the pixel interpolation unit 320 may determine that the pixels included in the target kernel 600 are similar when a value of abs(p3-p11) is smaller than a preset threshold value (i.e., the first logic level) and may determine a value of p3+(p9-p11) as the pixel data of the defect pixel DP. Likewise, the pixel interpolation unit 320 may determine that the pixels included in the target kernel 601 are not similar when the value of abs(p3-p11) is greater than the preset threshold value (i.e., the second logic level) and may determine a value of p3+{(p2-p4)+(p5-p7)

}/2 as the pixel data of the defect pixel DP. In an embodiment, when the value of abs(p3-p11) is greater than the preset threshold value (i.e., the second logic level), the pixel interpolation unit 320 may determine a value of p3+{(p2-p4)+(p5-p7)+(p6-p8)}/3 as the pixel data of the defect pixel DP.

In an example, if the direction of the target kernel, which has been determined by the direction determination unit 310, is a vertical direction, the pixel interpolation unit 320 may interpolate the pixel data of the target pixel, that is, the defect pixel DP, by using the pixel data of each of the pixels indicated in P1_V. In this case, when the attributed logic level between the pixels is the first logic level, the pixel interpolation unit 320 may interpolate the pixel data of the defect pixel DP by using the pixel data of each of the pixels indicated in a target kernel 602. Furthermore, when the attributed logic level is the second logic level, the pixel interpolation unit 320 may interpolate the pixel data of the defect pixel DP by using the pixel data of each of the pixels indicated in a target kernel 603. For example, if the direction of the target kernel, which has been determined by the direction determination unit 310, is a vertical direction, the pixel interpolation unit 320 may determine that the pixels included in the target kernel 602 are similar when a value of abs(p9-p11) is smaller than a preset threshold value (i.e., the first logic level) and may determine a value of p9+(p3-p11) as the pixel data of the defect pixel DP. Likewise, the pixel interpolation unit 320 may determine that the pixels included in the target kernel 603 are not similar when the value of abs(p9-p11) is greater than the preset threshold value (i.e., the second logic level) and may determine a value of p9+{(p2-p10)+(p5-p13)}/2 as the pixel data of the defect pixel DP.

In an embodiment, when the value of abs(p9-p11) is greater than the preset threshold value (i.e., the second logic level), the pixel interpolation unit 320 may determine a value of p9+{(p2-p10)+(p5-p13)+(p6-p14)}/3 as the pixel data of the defect pixel DP.

In an embodiment, if the direction of the target kernel, which has been determined by the direction determination unit 310, is a slash direction, the pixel interpolation unit 320 may interpolate the pixel data of the target pixel, that is, the defect pixel DP, by using the pixel data of each of the pixels indicated in P1_D1. In this case, the pixel interpolation unit 320 might not determine whether the pixels included in the target kernel are similar because a pixel that is disposed in the slash direction of the target pixel, that is, the defect pixel DP, and that corresponds to the same color and the same channel as the target pixel is not present within a target kernel 604 and may interpolate the pixel data of the defect pixel DP by using the pixel data of each of the pixels indicated in the target kernel 604. For example, if the direction of the target kernel, which has been determined by the direction determination unit 310, is a slash direction, the pixel interpolation unit 320 may determine that a pixel that is disposed in the slash direction of the target pixel, that is, the defect pixel DP, and that corresponds to the same color and the same channel as the target pixel is not present within the target kernel 604 and may determine a value of p3+(p9-p11) as the pixel data of the defect pixel DP.

In an example, if the direction of the target kernel, which has been determined by the direction determination unit 310, is a backslash direction, the pixel interpolation unit 320 may interpolate the pixel data of the target pixel, that is, the defect pixel DP, by using the pixel data of each of the pixels indicated in P1_D2. In this case, when the attributed logic level between the pixels is the first logic level, the pixel interpolation unit 320 may interpolate the pixel data of the defect pixel DP by using the pixel data of each of the pixels indicated in a target kernel 605. Furthermore, when the attributed logic level is the second logic level, the pixel interpolation unit 320 may interpolate the pixel data of the defect pixel DP by using the pixel data of each of the pixels indicated in a target kernel 606. For example, if the direction of the target kernel, which has been determined by the direction determination unit 310, is a backslash direction, the pixel interpolation unit 320 may determine that the pixels included in the target kernel 605 are similar when a value of abs(p11-p16) is smaller than a preset threshold value (i.e., the first logic level) and may determine a value of p11+(p6-p16) as the pixel data of the defect pixel DP. Likewise, the pixel interpolation unit 320 may determine that the pixels included in the target kernel 601 are not similar when the value of abs(p11-p16) is greater than the preset threshold value (i.e., the second logic level) and may determine a value of p11+{(p2-p12)+(p5-p15)}/2 as the pixel data of the defect pixel DP.

In an example, when the value of abs(p11-p16) is greater than the preset threshold value (i.e., the second logic level), the pixel interpolation unit 320 may determine a value of p11+{(p2-p12)+(p5-p15)+(p6-p16)}/3 as the pixel data of the defect pixel DP.

Figure 6B:
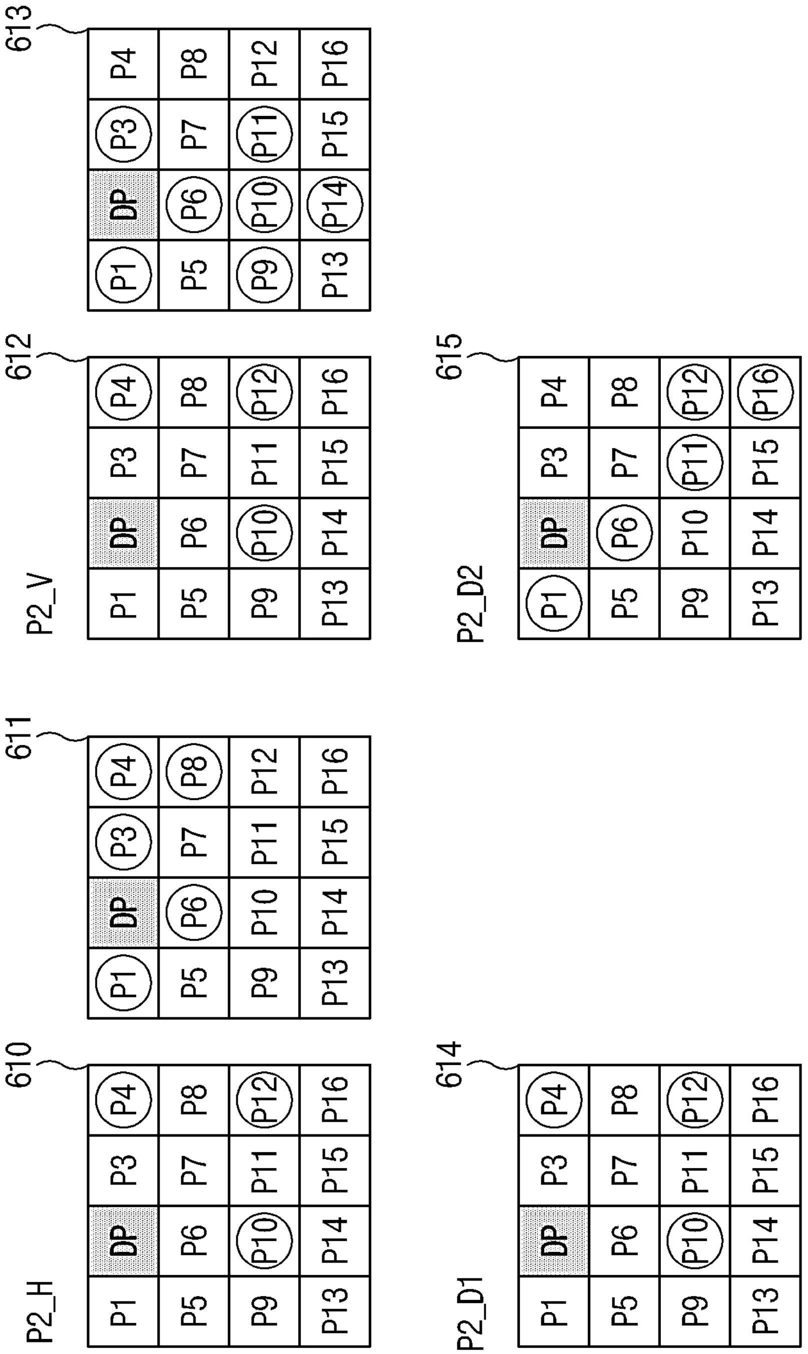
Figure 6C:
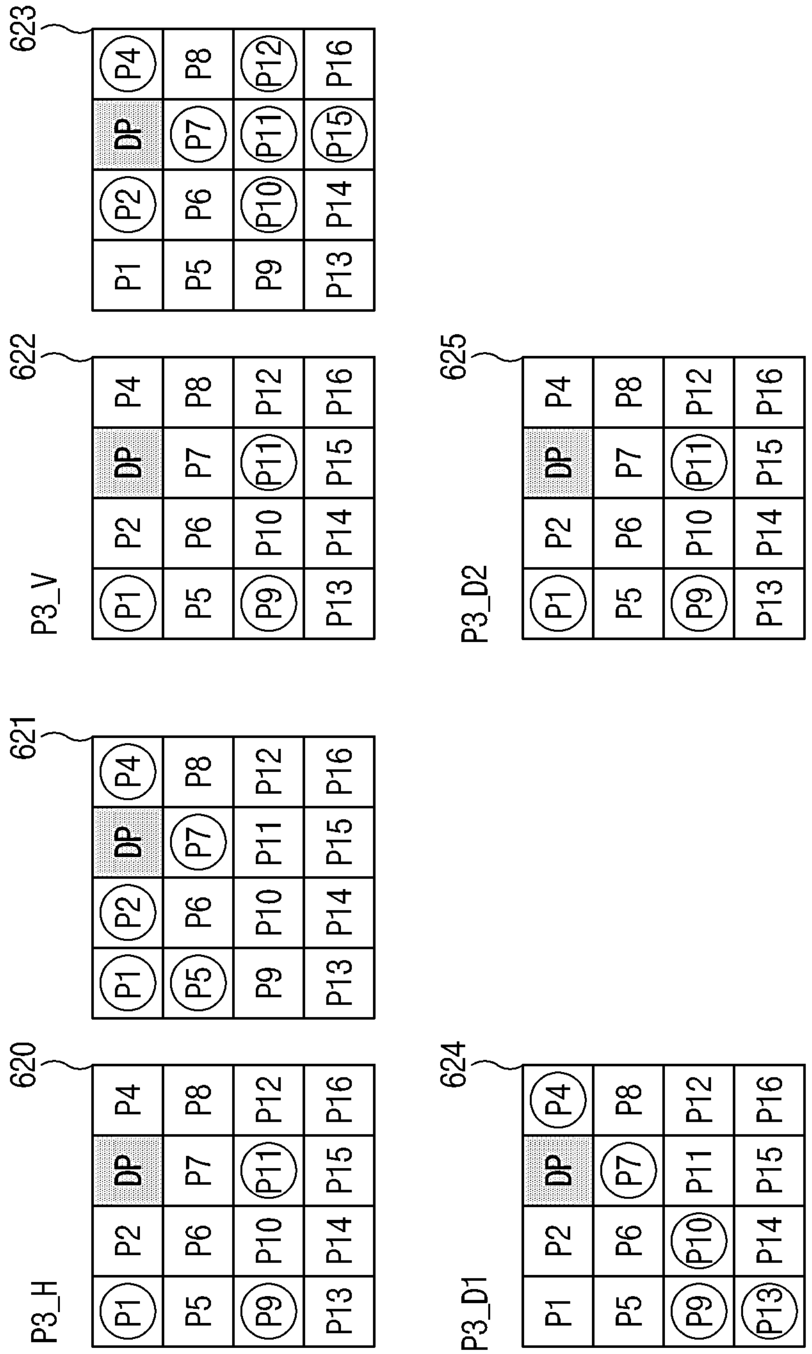
Figure 6D:
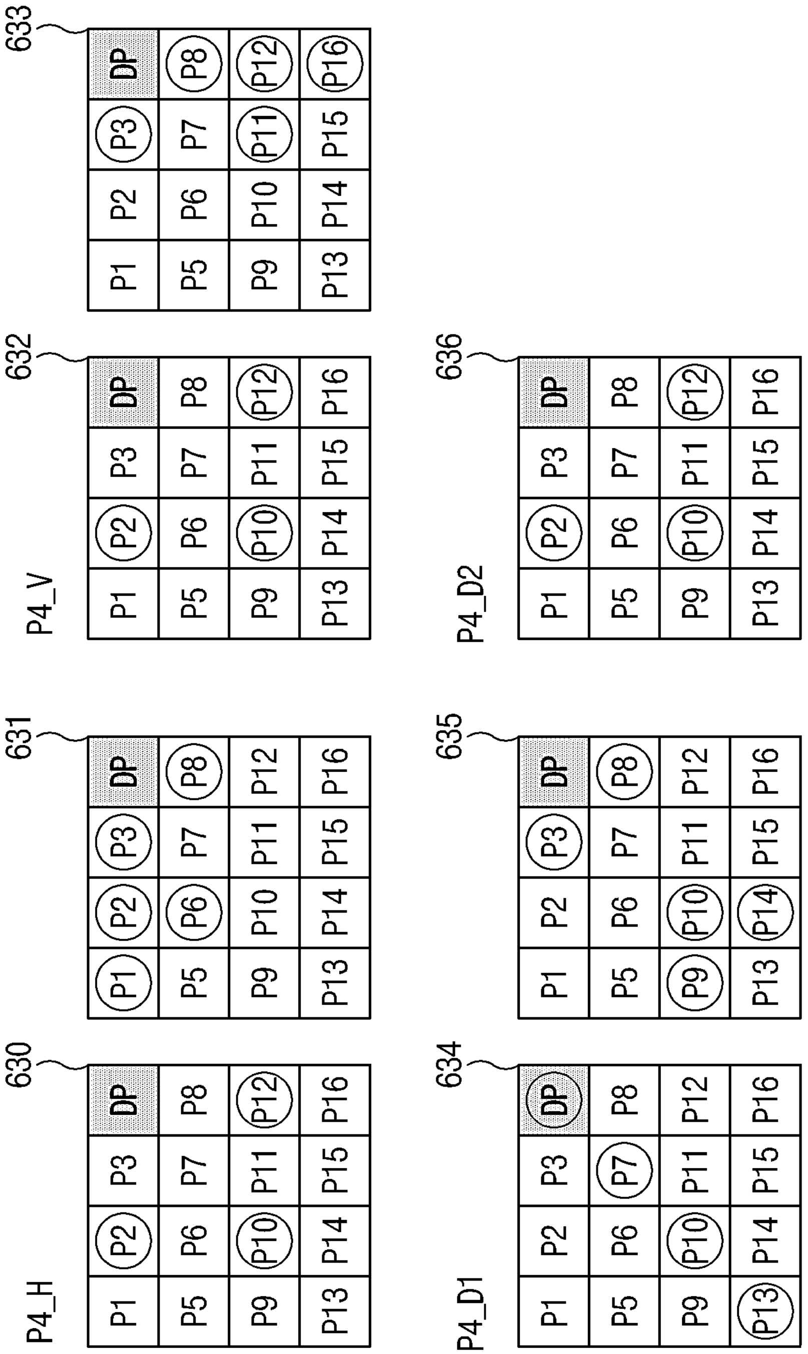
Figure 6E:
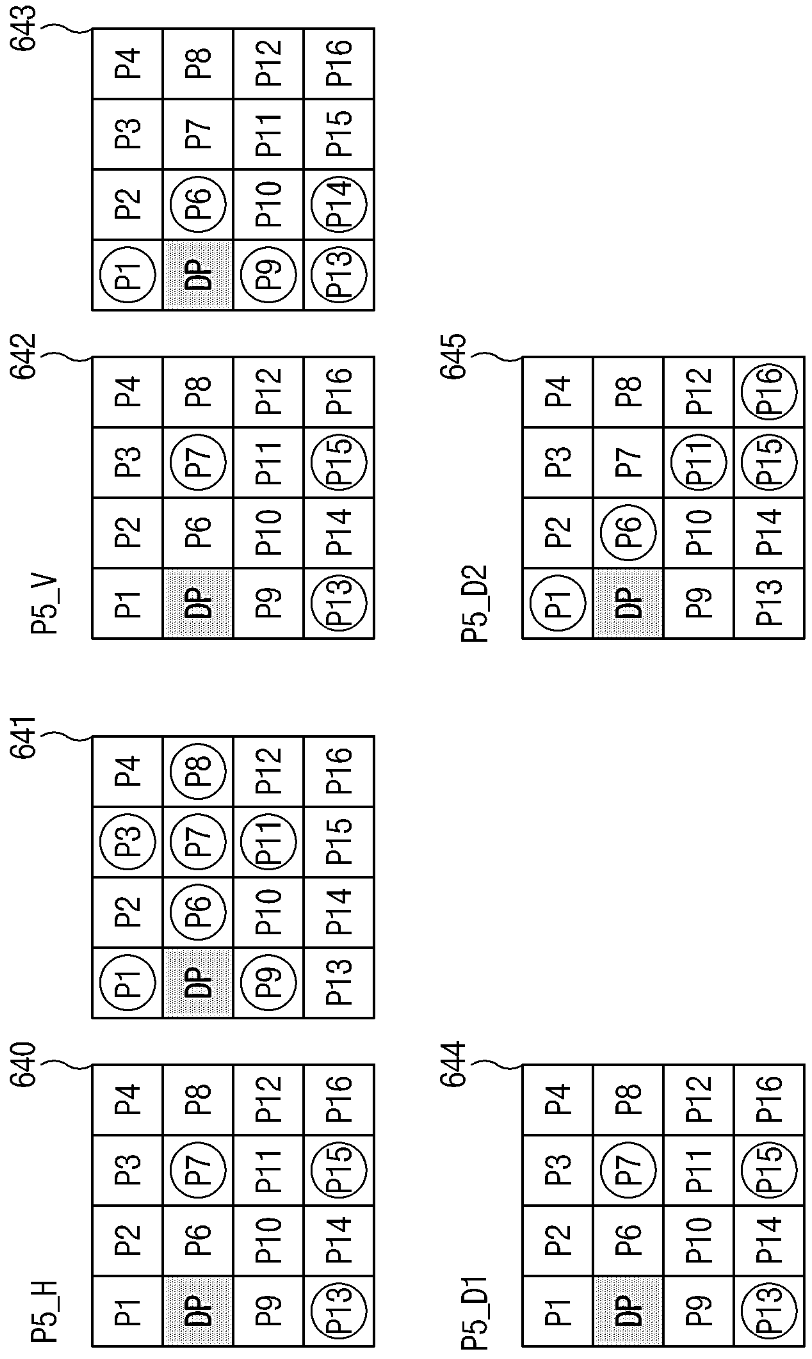
Figure 6F:
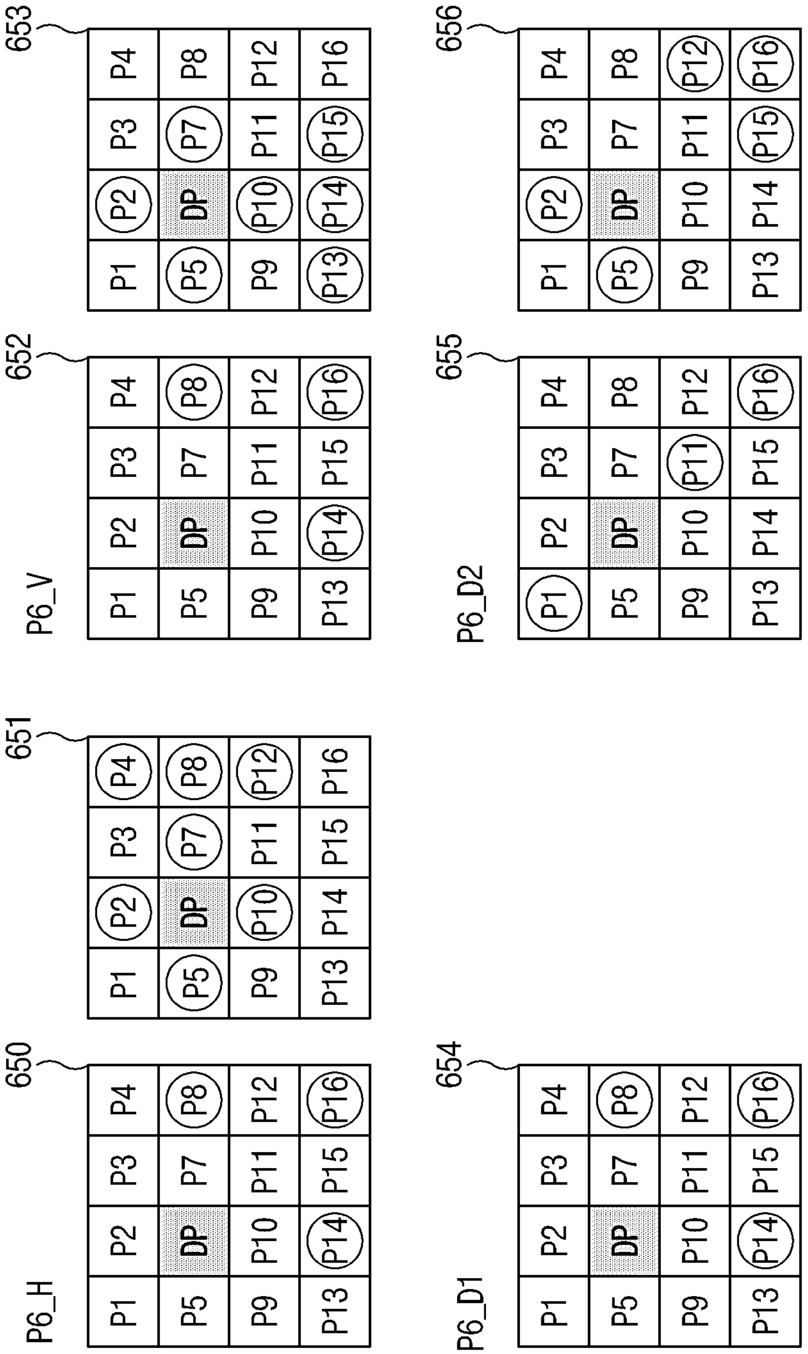
Figure 6G:
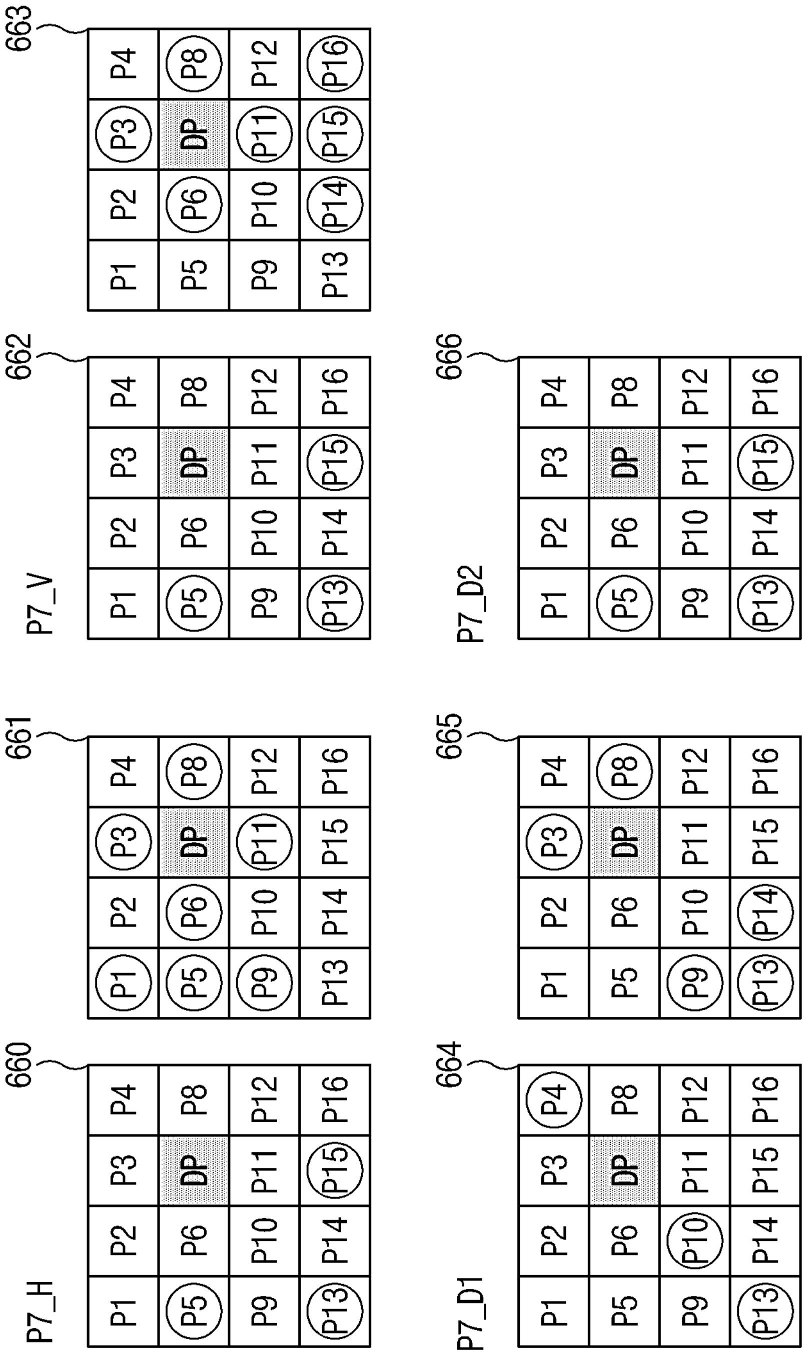
Figure 6H:
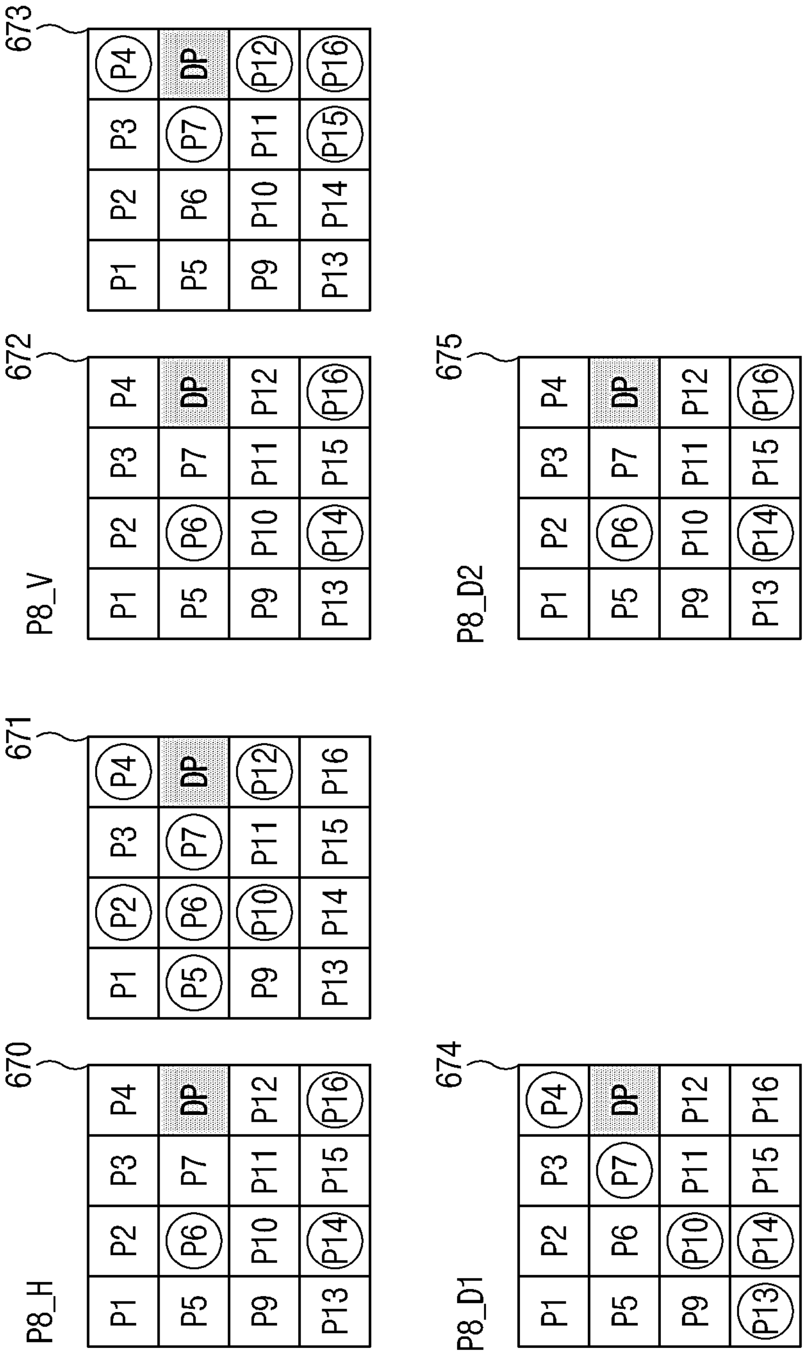

Referring to FIG. 6B, the pixel interpolation unit 320 may include the first pixel interpolation unit 330 and the second pixel interpolation unit 340 and may interpolate the pixel data of a target pixel (e.g., corresponding to each of portions bolded in FIG. 6B) by using the pixel data of each of the pixels (e.g., corresponding to portions circled in FIG. 6B) that are disposed at locations corresponding to the direction of the target kernel, which has been determined by the direction determination unit 310. In an example, when the attributed logic level between the pixels is the first logic level, if the pixels included in the target kernel are similar, the pixel interpolation unit 320 may interpolate the pixel data of the target pixel by using a gradient between the pixel data of the target pixel, that is, a defect pixel DP, the pixel data of each of the pixels having the same attributes as the target pixel. If the pixels included in the target kernel are not similar, the pixel interpolation unit 320 may interpolate the pixel data of the target pixel by using a gradient between the pixel data of a neighboring pixel that neighbors the target pixel, that is, the defect pixel DP, and the pixel data of each of the pixels having the same attributes as the neighboring pixel. In this case, the same attributes may be attributes corresponding to the same color and the same channel.

In an example, if the direction of the target kernel, which has been determined by the direction determination unit 310, is a horizontal direction, the pixel interpolation unit 320 may interpolate the pixel data of the target pixel, that is, the defect pixel DP, by using the pixel data of each of the pixels indicated in P2_H. When the attributed logic level between the pixels is the first logic level, the pixel interpolation unit 320 may interpolate the pixel data of the defect pixel DP by using the pixel data of each of the pixels indicated in a target kernel 610. Furthermore, when the attributed logic level is the second logic level, the pixel interpolation unit 320 may interpolate the pixel data of the defect pixel DP by using the pixel data of each of the pixels indicated in a target kernel 611. Hereinafter, it is assumed that the pixel data of pixels P1, and P3 to P16 are p1, and p3 to p16, respectively. For example, if the direction of the target kernel, which has been determined by the direction determination unit 310, is a horizontal direction, when a value of abs(p4-p12) is smaller than a preset threshold value (i.e., the first logic level), the pixel interpolation unit 320 may determine that the pixels included in the target kernel 610 are similar and may determine a value of p4+(p10-p12) as the pixel data of the defect pixel DP. Likewise, when the value of abs(p4-p12) is greater than the preset threshold value (i.e., the second logic level), the pixel interpolation unit 320 may determine that the pixels included in the target kernel 611 are not similar and may determine a value of p4+{(p1-p3)+(p6-p8)}/2 as the pixel data of the defect pixel DP.

In an example, when the value of abs(p4-p12) is greater than the preset threshold value, the pixel interpolation unit 320 may determine a value of p4+{(p1-p3)+(p5-p7)+(p6-p8)}/3 as the pixel data of the defect pixel DP.

In an example, if the direction of the target kernel, which has been determined by the direction determination unit 310, is a vertical direction, the pixel interpolation unit 320 may interpolate the pixel data of the target pixel, that is, the defect pixel DP, by using the pixel data of each of the pixels indicated in P2_V. In this case, when the attributed logic level between the pixels is the first logic level, the pixel interpolation unit 320 may interpolate the pixel data of the defect pixel DP by using the pixel data of each of the pixels indicated in a target kernel 612. Furthermore, when the attributed logic level is the second logic level, the pixel interpolation unit 320 may interpolate the pixel data of the defect pixel DP by using the pixel data of each of the pixels indicated in a target kernel 613. For example, if the direction of the target kernel, which has been determined by the direction determination unit 310, is the vertical direction, when a value of abs(p10-p12) is smaller than a preset threshold value (i.e., the first logic level), the pixel interpolation unit 320 may determine that the pixels included in the target kernel 612 are similar and may determine a value of p10+(p4-p12) as the pixel data of the defect pixel DP. Likewise, when the value of abs(p10-p12) is greater than the preset threshold value (i.e., the second logic level), the pixel interpolation unit 320 may determine that the pixels included in the target kernel 613 are not similar and may determine a value of p10+{(p1-p9)+(p3-p11)+(p6-p14)}/3 as the pixel data of the defect pixel DP. In an example, when the value of abs(p10-p12) is greater than the preset threshold value (i.e., the second logic level), the pixel interpolation unit 320 may determine a value of p10+{(p1-p9)+(p3-p11)+(p5-p13)+(p6-p14)+(p7-p15)}/5 as the pixel data of the defect pixel DP.

In an example, if the direction of the target kernel, which has been determined by the direction determination unit 310, is a slash direction, the pixel interpolation unit 320 may interpolate the pixel data of the target pixel, that is, the defect pixel DP, by using the pixel data of each of the pixels indicated in P2_D1. In this case, a pixel that is disposed in the slash direction of the target pixel, that is, the defect pixel DP, and that corresponds to the same color and the same channel as the target pixel is not present within a target kernel 614. Accordingly, the pixel interpolation unit 320 might not determine whether the pixels included in the target kernel are similar and may interpolate the pixel data of the defect pixel DP by using the pixel data of each of the pixels indicated in the target kernel 614. For example, if the direction of the target kernel, which has been determined by the direction determination unit 310, is the slash direction, the pixel interpolation unit 320 may determine that a pixel that is disposed in the slash direction of the target pixel, that is, the defect pixel DP, and that corresponds to the same color and the same channel as the target pixel is not present within the target kernel 614 and may determine a value of p4+(p10-p12) as the pixel data of the defect pixel DP.

In an example, if the direction of the target kernel, which has been determined by the direction determination unit 310, is a backslash direction, the pixel interpolation unit 320 may interpolate the pixel data of the target pixel, that is, the defect pixel DP, by using the pixel data of each of the pixels indicated in P2_D2. In this case, a pixel that is disposed in the backslash direction of the target pixel, that is, the defect pixel DP, and that corresponds to the same color and the same channel as the target pixel is not present within a target kernel 615. Accordingly, the pixel interpolation unit 320 might not determine whether the pixels included in the target kernel are similar and may interpolate the pixel data of the defect pixel DP by using the pixel data of each of the pixels indicated in the target kernel 614. For example, if the direction of the target kernel, which has been determined by the direction determination unit 310, is the backslash direction, the pixel interpolation unit 320 may determine that a pixel that is disposed in the backslash direction of the target pixel, that is, the defect pixel DP, and that corresponds to the same color and the same channel as the target pixel is not present within the target kernel 615, and may determine a value of p12+{(p1-p11)+(p6-p16)}/2 as the pixel data of the defect pixel DP.

In an example, if the direction of the target kernel, which has been determined by the direction determination unit 310, is a horizontal backslash direction, a vertical backslash direction, a horizontal slash direction, or a vertical slash direction, the pixel interpolation unit 320 may interpolate the pixel data of a target pixel, that is, a defect pixel DP, by using the pixel data of each of the pixels that are disposed at locations corresponding to the determined direction of the target kernel. If the pixels included in the target kernel are similar, the pixel interpolation unit 320 may interpolate the pixel data of the target pixel by using a gradient between the pixel data of the target pixel, that is, the defect pixel DP, and the pixel data of each of the pixels having the same attributes as the target pixel. If the pixels included in the target kernel are not similar, the pixel interpolation unit 320 may interpolate the pixel data of the target pixel by using a gradient between the pixel data of a neighboring pixel that neighbors the target pixel, that is, the defect pixel DP, and the pixel data of each of the pixels having the same attributes as the neighboring pixel. In this case, the same attributes may be attributes corresponding to the same color and the same channel. A detailed method of this example may be understood in the same manner as the methods disclosed with reference to FIGS. 6A and 6B.

Referring to FIGS. 6C to 6H, as in the method of detecting a defect pixel, which has been disclosed with reference to FIGS. 6A and 6B, the pixel interpolation unit 320 may interpolate the pixel data of a target pixel (e.g., corresponding to each of portions bolded in FIGS. 6C to 6H) by using the pixel data of each of the pixels (e.g., corresponding to portions circled in FIGS. 6C to 6H) that are disposed at locations corresponding to the direction of the target kernel, which has been determined by the direction determination unit 310. A detailed method of the pixel interpolation unit 320, which is illustrated in each of FIGS. 6C to 6H, may be understood in the same manner as the methods disclosed with reference to FIGS. 6A and 6B.

Figure 7:
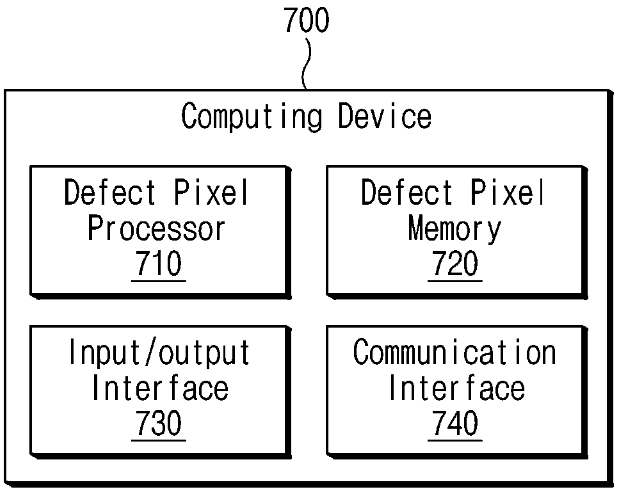
FIG. 7 is a block diagram illustrating an example of a computing device corresponding to the image signal processor of FIG. 1.

FIG. 7 is a block diagram illustrating an example of a computing device corresponding to the image signal processor of FIG. 1.

Referring to FIG. 7, a computing device 700 may illustrate an embodiment of a hardware construction for performing an operation of the image signal processor 100 of FIG. 1.

The computing device 700 may be mounted on a chip independently of a chip on which an image sensing device is mounted. According to an embodiment, the chip on which the image sensing device is mounted and the chip on which the computing device 700 is mounted may be embodied as one package, for example a multi-chip package (MCP), but the scope of the present disclosure is not limited thereto.

Furthermore, internal components or arrangements of the computing device 700 and the image sensing device may be different according to an embodiment. For example, at least some components of the image sensing device may be included in the computing device 700. Alternatively, at least some components of the computing device 700 may be included in the image sensing device. In this case, at least some components of the computing device 700 may be mounted on the chip on which the image sensing device is mounted.

The computing device 700 may include a processor 710, memory 720, an input and output interface 730, and a communication interface 740.

The processor 710 may process data and/or an instruction that are necessary to perform operations of the components 200 and 300 of the image signal processor 100, which have been described with reference to FIG. 1. That is, the processor 710 may mean the image signal processor 100 itself, but the scope of the present disclosure is not limited thereto.

The memory 720 may store data and/or an instruction that are necessary to perform operations of the components 200 and 300 of the image signal processor 100, and may be accessed by the processor 710. For example, the memory 720 may be embodied as volatile memory (e.g., dynamic random access memory (DRAM) or static random access memory (SRAM)) or nonvolatile memory (e.g., programmable read only memory (PROM), erasable PROM (EPROM), electrically erasable PROM (EEPROM), or flash memory).

That is, a computer program for performing an operation of the image signal processor 100 disclosed in this document may be recorded on the memory 720 and executed and processed by the processor 710, so that operations of the image signal processor 100 may be embodied.

The input and output interface 730 may provide an interface through which data can be transmitted and received by connecting an external input device (e.g., a keyboard, a mouse, or a touch panel) and/or an external output device (e.g., a display), and the processor 710.

The communication interface 740 may be component capable of transmitting and receiving various data to and from an external device (e.g., an application processor or external memory), I and may be a device capable of supporting wired or wireless communication.

What is claimed is:

1. An image signal processor comprising:

a defect pixel determination unit configured to determine whether a target pixel is a defect pixel based on first comparison data that are a result of comparing pixel data of the target pixel included in a target kernel with pixel data of each of a plurality of pixels having attributes identical with attributes of the target pixel;

a direction determination unit configured to determine a direction of the target kernel based on second comparison data that are a result of a comparison between pixel data of a pair of pixels that are disposed on a line in one direction and that have identical attributes; and a pixel interpolation unit configured to interpolate the pixel data of the target pixel by using the pixel data of each of a plurality of pixels that are disposed at locations corresponding to the direction of the target kernel;

wherein the defect pixel determination unit is configured to generate third comparison data that are results of a comparison between pixel data of a neighboring pixel that neighbors the target pixel and pixel data of each of a plurality of pixels having attributes identical with attributes of the neighboring pixel and determine whether the target pixel is the defect pixel based on a difference value between the first comparison data and the third comparison data.

2. The image signal processor of claim 1, wherein the attributes comprise a color filter and a channel.

3. The image signal processor of claim 2, wherein the target kernel has a Q×Q pattern.

4. The image signal processor of claim 3, wherein four microlenses correspond to a unit pattern of the target kernel.

5. The image signal processor of claim 2, wherein the first comparison data comprise a gradient between the pixel data of the target pixel and pixel data of each of a plurality of pixels that are disposed in a horizontal direction, vertical direction, and diagonal direction in relation to the target pixel and that have attributes identical with the attributes of the target pixel.

6. The image signal processor of claim 1, wherein the neighboring pixel comprises a pixel that shares a microlens with the target pixel.

7. The image signal processor of claim 1, wherein the third comparison data comprise a gradient between the pixel data of the neighboring pixel and the pixel data of each of a plurality of pixels that are disposed in a horizontal direction, vertical direction, and diagonal direction in relation to the neighboring pixel and that have attributes identical with attributes of the neighboring pixel.

8. The image signal processor of claim 1, wherein the defect pixel determination unit determines the target pixel as a defect pixel when a difference value between the first comparison data and the third comparison data is greater than a preset threshold value.

9. The image signal processor of claim 8, wherein the preset threshold value is set based on a standard deviation between pixels that are disposed in an identical channel within the target kernel.

10. The image signal processor of claim 1, wherein the second comparison data is a sum of all difference values between pixel data of pairs of pixels that are disposed in a horizontal direction, a vertical direction, a slash direction, and a backslash direction, respectively, among pairs of pixels having identical attributes.

11. The image signal processor of claim 10, wherein the slash direction is divided into a horizontal slash direction and a vertical slash direction, and wherein the backslash direction is divided into a horizontal backslash direction and a vertical backslash direction.

12. The image signal processor of claim 1, wherein the pixel interpolation unit determines a similarity between pixels included in the target kernel.

13. The image signal processor of claim 12, wherein the pixel interpolation unit determines the similarity between pixels included in the target kernel by attributing a logic level based on a difference value between the pixel data of each of the pixels having the attributes identical with the attributes of the target pixel, and wherein the attributed logic level is a first logic level or a second logic level.

14. The image signal processor of claim 13, wherein the pixel interpolation unit interpolates the pixel data of the target pixel by using the pixel data of each of the pixels having the attributes identical with the attributes of the target pixel when the attributed logic level is determined to be the first logic level.

15. The image signal processor of claim 13, wherein the pixel interpolation unit interpolates the pixel data of the target pixel by using pixel data of a neighboring pixel that neighbors the target pixel and pixel data of each of a plurality of pixels having attributes identical with attributes of the neighboring pixel when the attributed logic level is determined to be the second logic level.

16. An image signal processor comprising:

a defect pixel determination unit configured to determine whether a target pixel is a defect pixel based on first comparison data that are a result of comparing pixel data of the target pixel included in a target kernel with pixel data of each of a plurality of pixels having attributes identical with attributes of the target pixel; and a pixel interpolation unit configured to interpolate the pixel data of the target pixel by using pixel data of each of a plurality of pixels that are disposed at locations corresponding to a direction of the target kernel, wherein the identical attributes are attributes corresponding to an identical color and an identical channel;

wherein the defect pixel determination unit is configured to generate third comparison data that are results of a comparison between pixel data of a neighboring pixel that neighbors the target pixel and pixel data of each of a plurality of pixels having attributes identical with attributes of the neighboring pixel and determine whether the target pixel is the defect pixel based on a difference value between the first comparison data and the third comparison data.

17. A method of processing an image signal, the method comprising:

determining whether a target pixel is a defect pixel by comparing pixel data of the target pixel included in a target kernel with pixel data of a pixel corresponding to a color and channel identical with a color and channel of the target pixel;

determining a direction of the target kernel by comparing pixel data of each of a plurality of pixels that are disposed within the target kernel with pixel data of each of a plurality of pixels corresponding to a color and channel identical with a color and channel of the plurality of pixels; and interpolating the pixel data of the target pixel by using pixel data of each of a plurality of pixels that are disposed at locations corresponding to a direction of the target kernel;

wherein determining whether the target pixel is a defect pixel comprises comparing pixel data of each of a plurality of pixels that neighbor the target pixel with pixel data of each of a plurality of pixels corresponding to a color and channel identical with a color and channel of the pixels that neighbor the target pixel.

18. The method of claim 17, wherein the determining of the direction of the target kernel comprises comparing the pixel data of each of the plurality of pixels and pixel data of each of a plurality of pixels that correspond to a color and channel identical with a color and channel of the plurality of pixels and that are disposed in a horizontal direction, vertical direction, slash direction, and backslash direction of the plurality of pixels.

* * * * *